(12) United States Patent
Buckles et al.

(10) Patent No.: US 8,800,813 B1
(45) Date of Patent: Aug. 12, 2014

(54) METERING PRODUCT DELIVERY PUMP SYSTEM

(75) Inventors: John K. Buckles, Austin, MN (US);
John P. Hotek, Austin, MN (US); John T. Hays, Austin, MN (US); Gary D. Westland, Glenville, MN (US); Allan D. Olson, Osage, IA (US); Joseph C. Gray, Austin, MN (US)

(73) Assignee: Hormel Foods Corporation, Austin, MN (US)

( * ) Notice: Subject to any disclaimer, the term of this patent is extended or adjusted under 35 U.S.C. 154(b) by 258 days.

(21) Appl. No.: 13/296,972

(22) Filed: Nov. 15, 2011

(51) Int. Cl.
*B67D 1/00* (2006.01)
*B67D 1/16* (2006.01)
*B65D 88/54* (2006.01)
*G01F 13/00* (2006.01)

(52) U.S. Cl.
USPC .............................. 222/80; 222/108; 222/252

(58) Field of Classification Search
USPC ........... 222/80, 108, 227, 252, 254, 255, 256, 222/260–263; 141/125, 264, 86–88; 53/235, 237, 239, 467; 426/518
See application file for complete search history.

(56) References Cited

U.S. PATENT DOCUMENTS

| | | | |
|---|---|---|---|
| 3,733,653 A | 5/1973 | Javaloy et al. |
| 3,794,087 A | 2/1974 | Spano et al. |
| 4,326,568 A | 4/1982 | Burton et al. |
| 4,641,487 A | 2/1987 | Darecchio |
| 4,872,241 A | 10/1989 | Lindee |
| 5,041,297 A | 8/1991 | Dowaliby |
| 5,456,298 A | 10/1995 | Tennis |
| 7,284,973 B2 | 10/2007 | Van Esbroeck et al. |
| 7,455,517 B2 | 11/2008 | LaBruno et al. |
| 2010/0129513 A1 | 5/2010 | Le Paih |

*Primary Examiner* — Paul R Durand
*Assistant Examiner* — Vishal Pancholi
(74) *Attorney, Agent, or Firm* — IPLM Group, P.A.

(57) ABSTRACT

A metering product delivery pump system that includes a product accumulator assembly, at least one controlled product dispensing assembly and a rotary gate valve assembly for each controlled product dispensing assembly is provided. The product accumulator assembly is coupled to receive product. The at least one controlled product dispensing assembly outputs product to a product package. Each rotary gate valve assembly is coupled to selectively pass product between the product accumulator system and an associated controlled product dispensing assembly. Each rotary gate valve assembly includes a rotary gate valve and at least one blade configured and arranged to engage the rotary gate valve to cut solid product as the rotary gate valve is rotated.

19 Claims, 18 Drawing Sheets

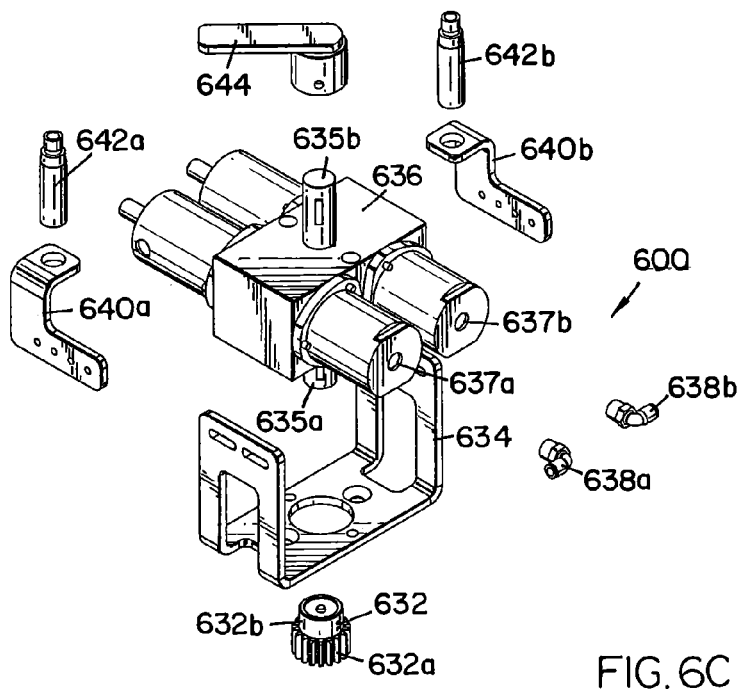
FIG. 6C
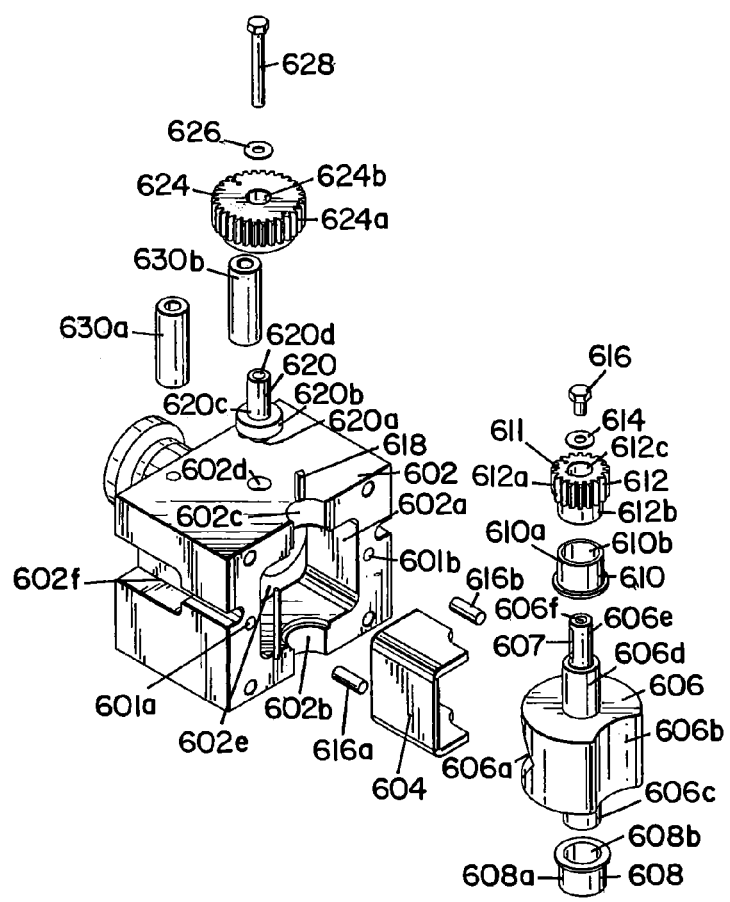

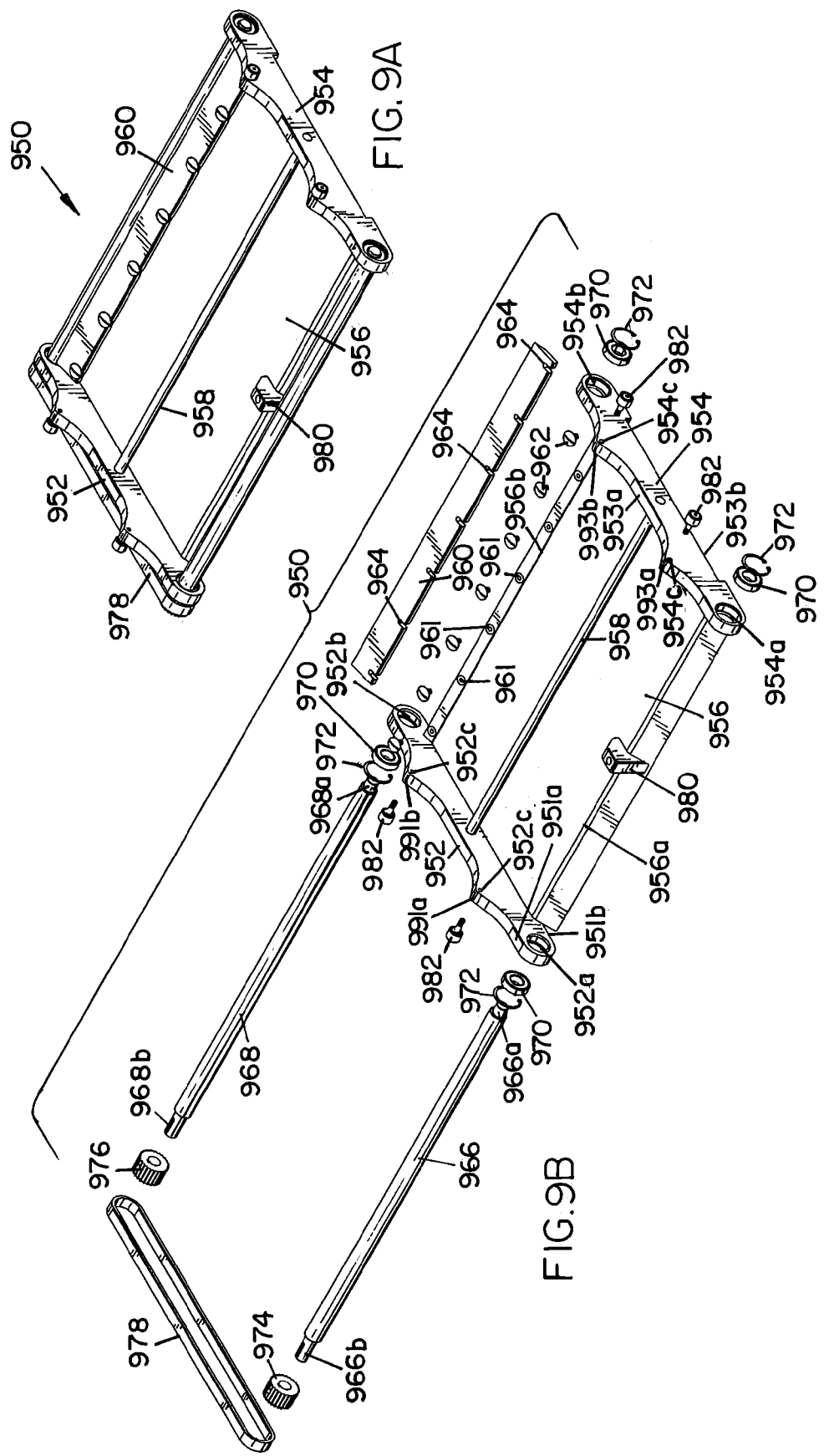

METERING PRODUCT DELIVERY PUMP SYSTEM

BACKGROUND

Product packaging is an important part of the process of providing products to a consumer. The packaging process can be a labor intensive and a time consuming process. Many producers of product have automated the process to address the labor intensive and time consuming process as well as to address the desire to have a system that provides consistent product amounts in each product package. The packaging of a mixed product that includes both a liquid and solid can cause problems because the solid portions can clog current systems which are typically made to only handle liquids therein leading to significant downtime of the system while, the system is unclogged manually.

For the reasons stated above and for other reasons stated below which will become apparent to those skilled in the art upon reading and understanding the present specification, there is a need in the art for an effective and efficient metering product delivery pump system that can handle a mixed product of liquid and solid.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a metering product delivery pump system is provided. The system includes a product accumulator assembly, at least one controlled product dispensing assembly and a rotary gate valve assembly for each controlled product dispensing assembly. The product accumulator assembly is coupled to receive product. The at least one controlled product dispensing assembly outputs product to a product package. Each rotary gate valve assembly is coupled to selectively pass product between the product accumulator system and an associated controlled product dispensing assembly. Each rotary gate valve assembly includes a rotary gate valve and at least one blade configured and arranged to engage the rotary gate valve to cut solid product as the rotary gate valve is rotated.

In another embodiment, another metering product delivery pump system is provided. The system includes a product accumulator assembly, a metering valve control assembly, a metering control assembly, a gate plate assembly and a controller. The product accumulator assembly includes a product accumulator cylinder, an accumulator piston and an accumulator actuator. The product accumulator cylinder is in fluid communication with a product input. The accumulator piston is received in the product accumulator cylinder and the accumulator actuator coupled to move the piston. The metering valve control assembly is in fluid communication with the product accumulator cylinder. The metering valve control assembly includes a rotary gate valve and a rotary gate valve actuator. The rotary gate valve is configured and arranged to rotate to selectively pass product and the rotary gate valve actuator is coupled to rotate the rotary valve. The metering control assembly has an output to dispense product to a package. The metering control assembly includes a dispensing cylinder, a piston assembly and a metered actuator. The dispensing cylinder is in fluid communication with the metering valve control assembly to receive product from the metering valve control assembly. The piston assembly is at least received in part in the dispensing cylinder and the metered actuator is coupled to selectively move the piston assembly. The gate plate assembly includes a gate plate and a gate plate actuator. The gate plate is configured and arranged to selectively cover the output of the metering control assembly. The gate plate actuator is coupled to selectively move the gate plate. Finally, the controller is coupled to control the accumulator actuator, the rotary gate valve actuator, the metered actuator and the gate plate actuator in a synchronized fashion to dispense product into a package.

In another embodiment, still another metering product delivery pump system is provided. The system includes a product accumulator assembly, at least one controlled product dispensing assembly, a rotary gate valve assembly for each controlled product dispensing assembly and a gate plate. The product accumulator assembly is coupled to receive and temporarily store product. The at least one controlled product dispensing assembly outputs a select amount of product to a product package. Each rotary gate valve assembly is coupled to selectively pass product between the product accumulator system and an associated controlled product dispensing assembly. Each rotary gate valve assembly includes a rotary gate valve and at least one blade configured and arranged to engage the rotary gate valve to cut solid product as the rotary gate valve is rotated. The gate plate is configured and arranged to selectively prevent the discharge of product from the controlled product dispensing assembly.

BRIEF DESCRIPTION OF THE DRAWINGS

The present invention can be more easily understood and further advantages and uses thereof will be more readily apparent, when considered in view of the detailed description and the following figures in which:

FIG. 6C is an exploded side perspective view of the rotary gate valve assembly of FIG. 6A;

FIG. 9A is a side view of a drip pan of one embodiment of the present invention;

FIG. 9B is an exploded side view of a drip pan assembly of FIG. 9A;

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Figure 1:
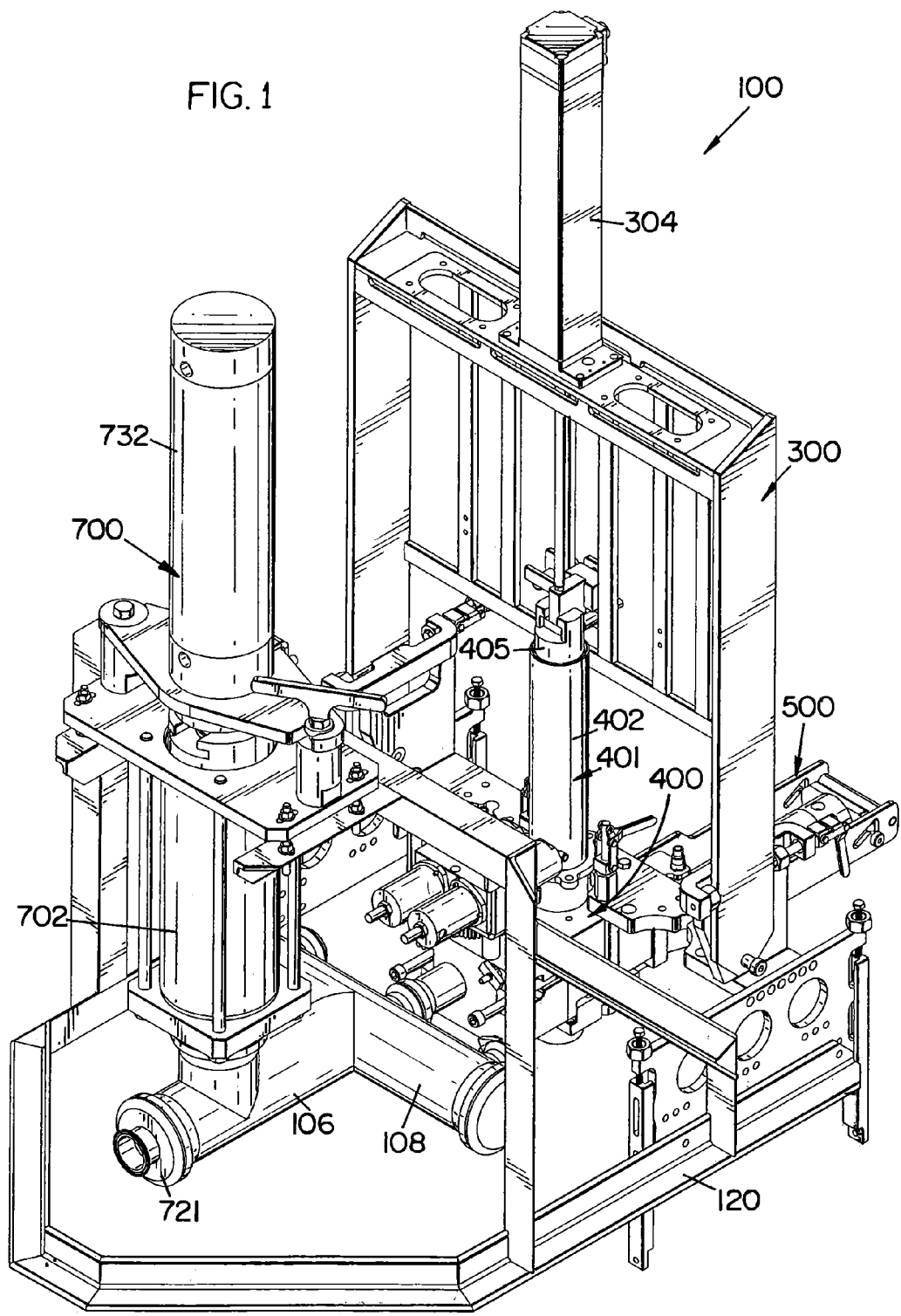
FIG. 1 is a side perspective view of a metering product delivery pump system of one embodiment of the present invention.

Embodiments of the present invention provide a metering product delivery pump system 100. The pump system 100 delivers a select amount of product into a product package. FIG. 1 illustrates an embodiment of a pump system 100. The pump system 100 includes a product accumulator assembly 700, a rotary gate valve assembly 600, a metering valve control assembly 400 and a metering control assembly 300 which are all mounted on a frame 120.

Figure 6A:
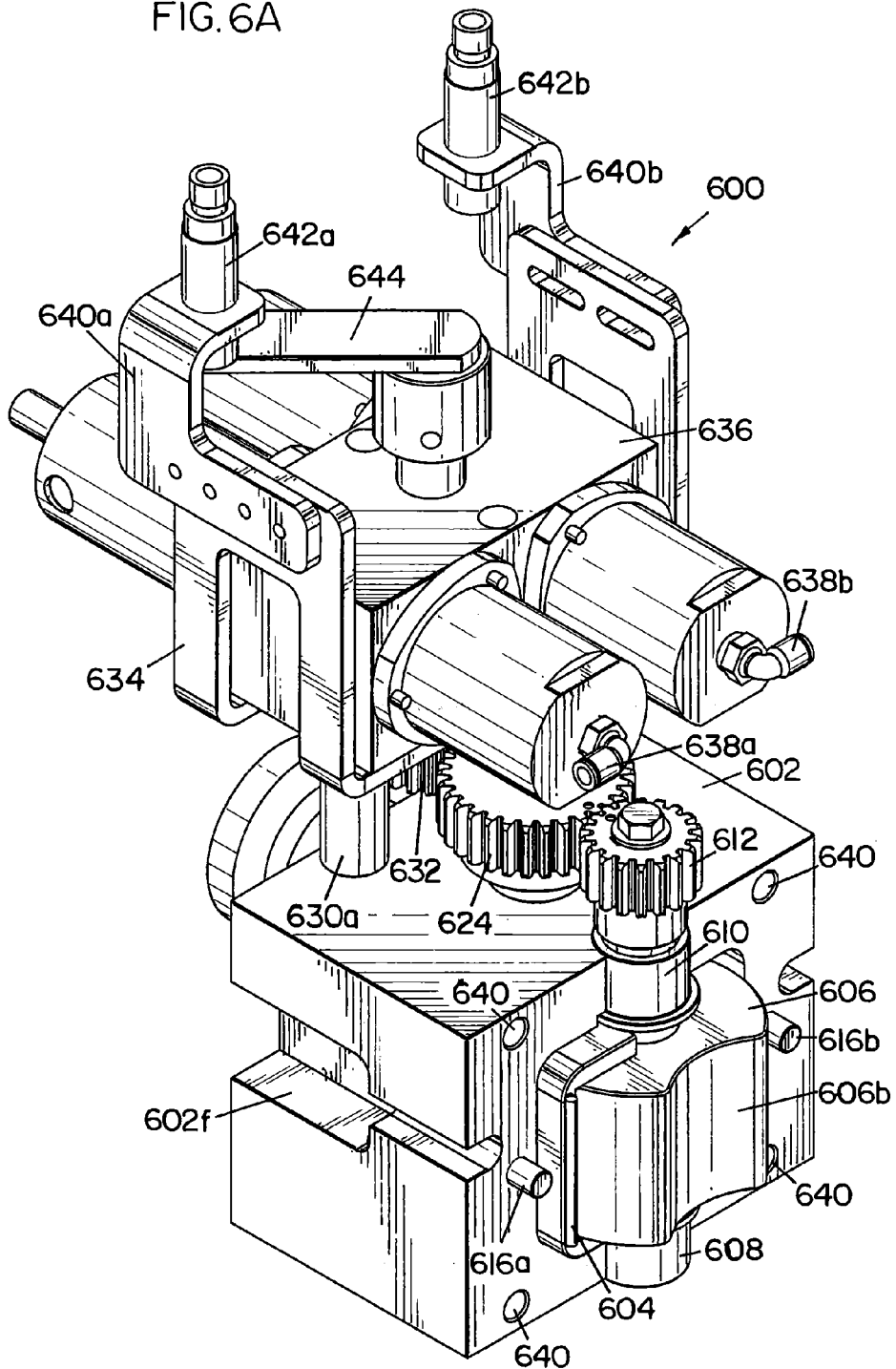
FIG. 6A is a side perspective view of a rotary gate valve assembly of one embodiment of the present invention with the rotary gate valve in a closed position.
Figure 6B:
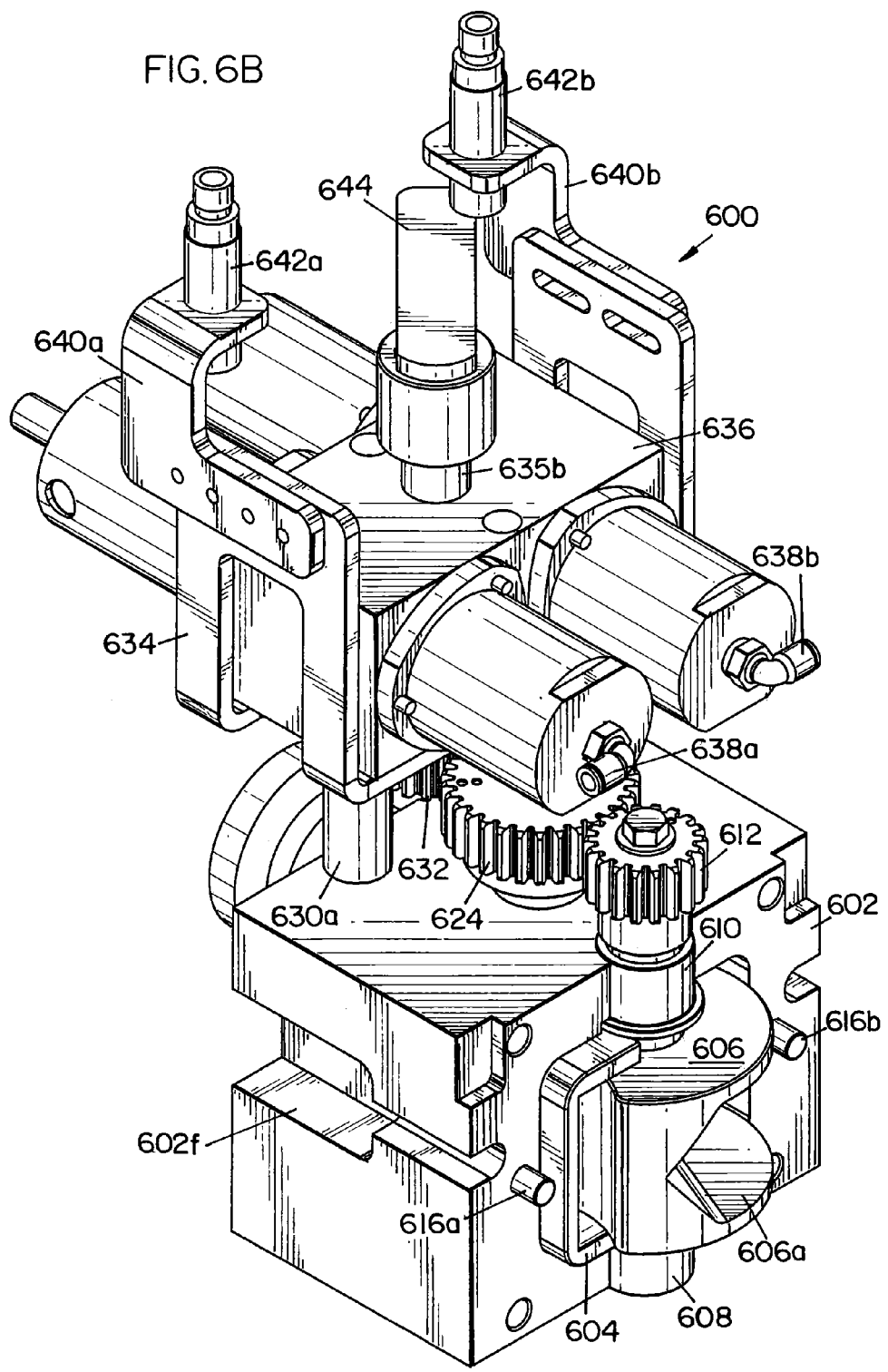
FIG. 6B is a side perspective view of the rotary gate valve assembly of FIG. 6A with the rotary gate valve in an opening position.

The rotary gate valve assembly 600 is described in view of FIGS. 6A-6C. FIG. 6A illustrates a side perspective view of the rotary gate valve assembly 600 having its rotary guide valve 606 in a closed position. FIG. 6B illustrates a side perspective view of the rotary gate valve assembly 600 having its rotary guide valve 606 in an open position. FIG. 6C illustrates a side perspective view of an exploded view of the rotary gate valve assembly 600. The rotary gate valve assembly 600 includes a gate block 602. The gate block 602 includes an inner passage 602e through which product selectively passes via the positioning of the rotary gate valve 606. A first side of the gate block 602 includes a cavity 602a that extends into the passage 602e. One side of the cavity 602a of the gate block 60 is designed to receive a block insert 604. The block insert 604 is designed to fill part of the cavity 602a to prevent the collection of chucks of product from forming in the cavity 602a of the gate block 602. The cavity 602a of the gate block 602 is further designed to receive a portion of the rotary gate valve 606. The rotary gate valve 606 includes a cutout product passage portion 606a and a blocking portion 606b. The rotary gate valve 606 further includes a lower shaft 606c which extends centrally from a lower surface of the rotary gate valve 606 and a first upper shaft 606d that extends from an upper surface of the rotary gate valve 606 in an opposed fashion in relation to the lower shaft 606c. A second upper shaft 606e centrally extends from the first upper shaft 606d. The second upper shaft 606e has a smaller diameter than the first upper shaft 606d. A first bushing 608 with an inner bore 608b receives the lower shaft 606c of the rotary gate valve 606. An outer surface 608a of the first bushing 608 is received in a groove 602b of the gate block 602. A second bushing 610 having an inner bore 610b receives the first upper shaft 606d of the rotary gate valve 606. An outer surface 610a of the second bushing 610 is received in a second groove 602c of the gate block 602. This arrangement, in part, allows the rotary gate valve 606 to rotate within the cavity 602a of the gate block 602 to selectively position the cutout product passage portion 606a of the rotary gate valve 606 to allow product to pass through the passage 602e of the gate block 602 as illustrated in FIG. 6B and to selectively position the blocking portion 606b of the rotary gate valve 606 to prevent product from passing through the passage 602e of the gate block 602 as illustrated in FIG. 6A.

A first gear 612 (gate valve gear) is coupled to the second upper shaft 606e. In particular, gate valve gear 612 includes an inner bore 612c that receives the second upper shaft 606e of the rotary gate valve 606. The inner bore 612c of the gate valve gear 612 includes a first keyway cutout 611. The second upper shaft 606e of the rotary gate valve 606 further includes a second keyway cutout 607. A keyway shaft 618 is positioned in the first keyway cutout 611 of the gate valve gear 612 and the second keyway cutout 607 of the second upper shaft 606e of the rotary gate valve 606 to lock the rotation of the rotary gate valve 606 with the gate valve gear 612. The second upper shaft 606e includes a threaded bore 606f. A threaded fastener 616 is engaged with the threaded bore 606f of this second upper shaft 606e to retain the gate valve gear 612 on the second upper shaft 606e of the rotary gate valve 606. A washer 614 is positioned between a head of the fastener 616 and an upper surface of the gate valve gear 612.

An upper surface of the gate block 602 includes a central receiving bore 602d. An insertion shaft portion 620a extending form a mid portion 620b of a stub shaft 620 is received in the central receiving bore 602d of the gate block 620. The stub shaft 620 further includes a gear shaft portion 620c. An inner bore 624b of a second gear 624 receives the gear shaft portion 620c of the stub shaft 620. Splines 624a of the second gear 624 engage splines 612a of the first valve gear 612. A fastener 628 threadably engages a threaded inner bore 620d of the gear shaft portion 620c of the stub shaft 620 to couple the second gear 624 to the stub shaft 620. A washer 626 is positioned between a head of the fastener 628 and a top surface of the second gear 624. A mounting plate 634 is coupled to the gate block 602 via spacers 630a and 630b. An actuator 636 is coupled to the mounting plate 634. The actuator 636 includes a lower turning rod 635a. A third gear 632 that includes an upper shaft portion 632b is coupled to the lower turning rod 635a of the actuator 636. Splines 632a of the third gear 632 engage splines 624a of the second gear 624. The actuator 636 further includes an upper turning rod portion 635b and actuator passages 637a and 637b. Tube fittings 638a and 638b fit in the respective actuator passages 637a and 637b of the actuator 636. The tube fittings 638a and 638b are designed to be coupled to an air source (not shown in FIGS. 6A-6C) that runs actuator 636. Brackets 640a and 640b are coupled to opposing sides of the mounting plate 634. Gate valve position inductor sensors 642a and 642b are coupled to the respective brackets 640a and 640b. A positioning flag 644 is coupled to the upper portion turning rod 635b which rotates when the lower turning rod 635a is rotated by the actuator 636. The positioning flag 644 indicates the position of the rotary gate valve 606. Inductor sensors 642a and 642b are inductive proximity sensors in one embodiment that detect a disturbance of an internally generated magnetic field by a metal object (such as the positioning flag 644) that comes in close proximity to the sensor, as is known in the art. When a disturbance in the magnetic field is detected, the sensor sends a signal. When the metal flag 644 is located proximate the first inductor sensor 642a as illustrated in FIG. 6A, a closed signal is sent to a controller 1002 (illustrated in FIG. 10) that indicates the gate valve 606 is in a closed position as discussed further below. When the metal flag 644 is located proximate the second inductor sensor 642b as illustrated in FIG. 6B, an open signal is sent to the controller 1002 that indicates the gate valve 606 is in an open position as further discussed below. Based in part on the open and closed signals, the controller 1002 coordinates the operation of the metering product delivery pump system 100.

Figure 3A:
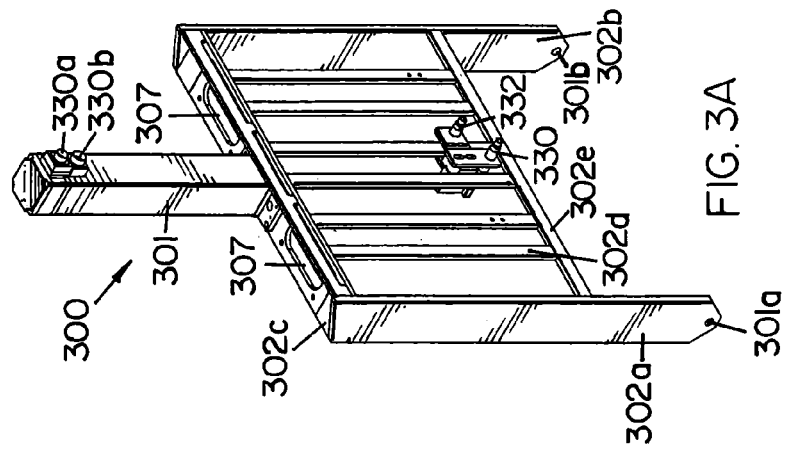
FIG. 3A is a first side perspective view of a metering control assembly of one embodiment of the present invention.
Figure 3B:
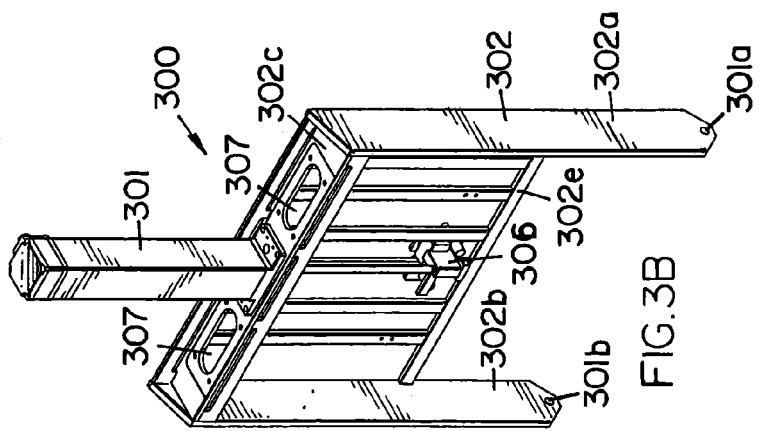
FIG. 3B is a second side perspective view of the metering control assembly of FIG. 3A.
Figure 3C:
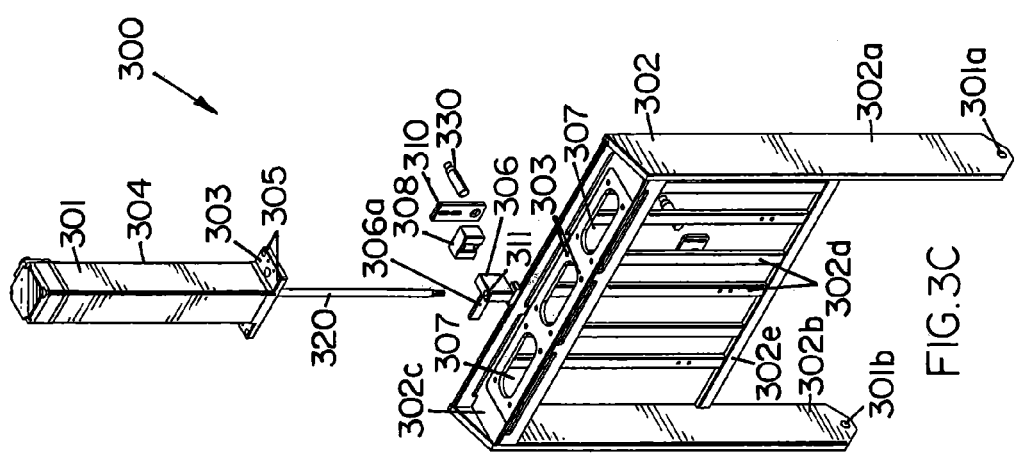
FIG. 3C is an exploded second side perspective view of the metering control assembly of FIG. 3A.
Figure 4A:
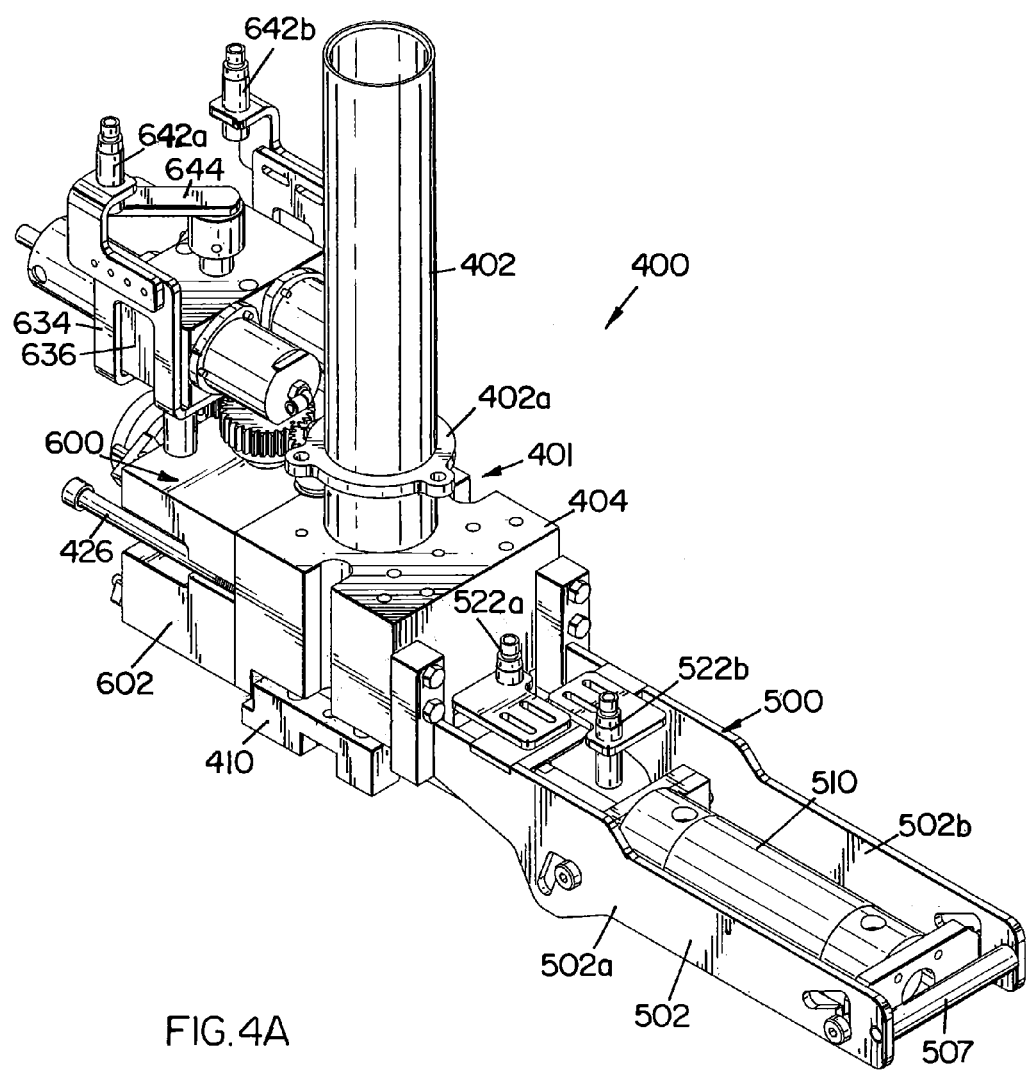
FIG. 4A is a side perspective view of a metering valve control assembly of one embodiment of the present invention.
Figure 4B:
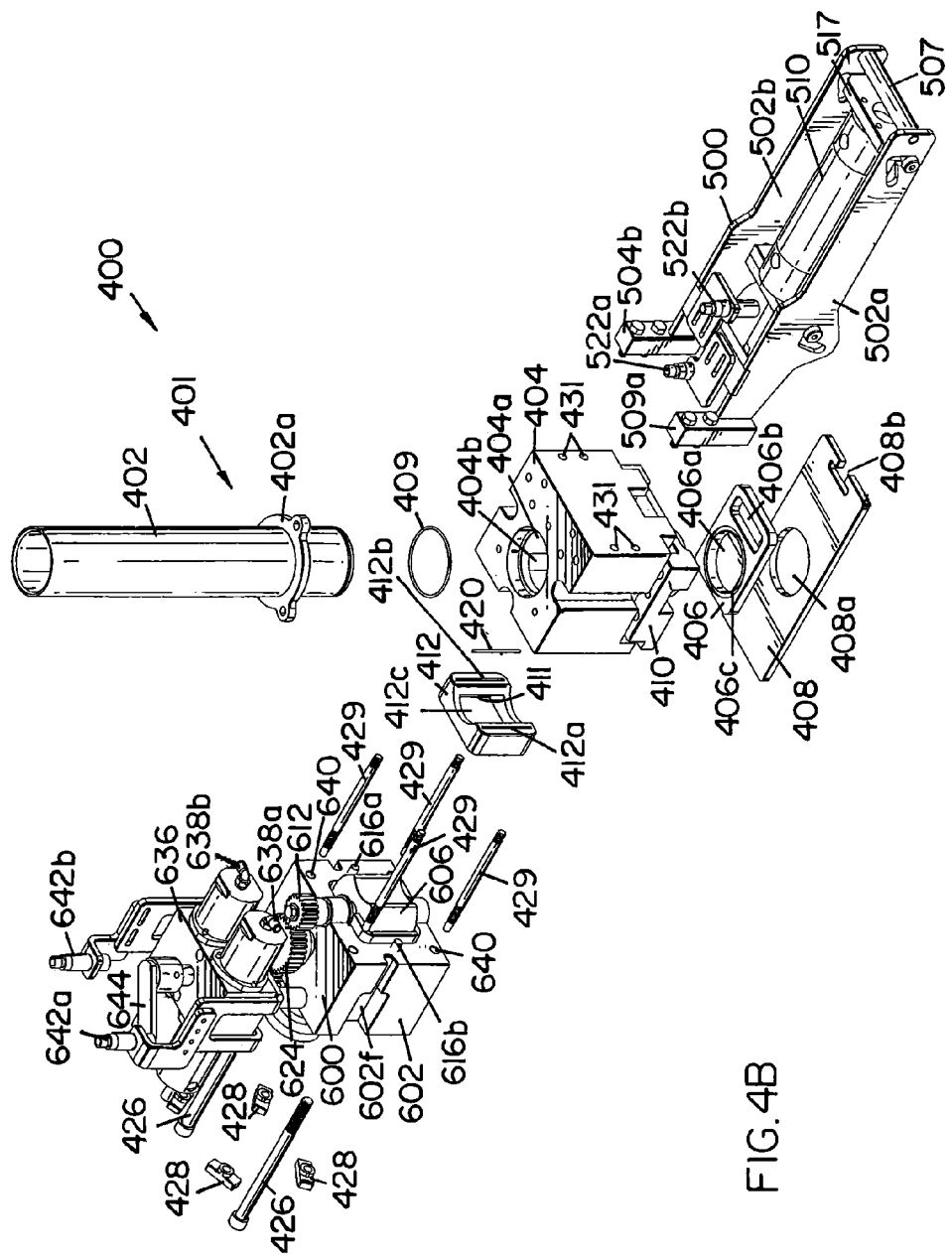
FIG. 4B is an exploded side perspective view of the metering valve control assembly of FIG. 4A.

The metering valve control assembly 400 includes the rotary gate valve assembly 600, a control product dispensing assembly 401 and gate control assembly 500 as illustrated in the assembled side perspective view of FIG. 4A and the exploded view of FIG. 4B. In one embodiment, the metering valve control assembly 400 includes the metering control assembly 300 further described below in regards to FIGS. 3A-3C. The metering valve control assembly 400 provides a select amount of product to a product package. The controlled product dispensing assembly 401, as illustrated in FIGS. 4A and 4B, includes a dispensing cylinder 402 and the main housing metering block 404. The main housing metering block 404 includes an inner passage 404a. One side of the main housing metering block 404 includes an opening 404b that extends into the inner passage 404a. The dispensing cylinder 402 is in fluid communication with the inner passage 404a of the main housing metering block 404 proximate an upper side of the metering block 404. An O-ring 409 is positioned in the inner passage 404a to create a seal between the dispensing cylinder 402 and the metering block 404. A retaining flange 402a, coupled to the dispensing cylinder 402, is connected to the metering block 404 to retain the dispensing cylinder 402 in a static relation with the metering block 404. A retaining plate 410 is coupled to the bottom of the metering block 404.

The controlled product dispensing assembly 401 further includes a shear plate 406. The shear plate 406 is received in a pocket (not shown) formed in the bottom of the metering block 404. The pocket and the retaining plate 410 hold the shear plate 406 and a static relationship with regards to the metering block. The shear plate 406 is a replaceable wear item that is mated with the gate plate 408 as discussed below. The shear plate 406 includes a product passage 406a that is aligned with the inner passage 404a of the metering block 404. The shear plate 406 includes a groove 406c formed around the product passage 406a for an O-ring (similar to O-ring 409 that seals the product passage 406 from the pocket in the bottom of the metering block 404. The shear plate 406 further includes a handling passage 406b. The handling passage 406b provides a finger hold during replacement and also reduces surface to surface contact with the gate plate 408. The gate plate 408 is positioned to abut the shear plate 406. The retaining plate 410 slidably holds the gate plate 408 adjacent the shear plate 406. The gate plate 408 includes a product passage 408a that is selectively aligned with the product passage 406a of the shear plate 406. The gate plate 408 further includes a cutout connection portion 408b that is positioned along an edge of the gate plate 408. The gate control assembly 500 engages the gate plate 408 via the cutout connection portion 408b to selectively align the product passage 408a of the gate plate 408 with the product passage 406a of the shear plate 406 as is further discussed below.

As further illustrated in FIG. 4B, a gate valve cover 412 is positioned to cover a portion of the rotary gate valve 606 that is outside gate block 602. The gate valve cover 412 includes biasing grooves 412a and 412b. Biasing members 420 (only one is shown in FIG. 4B) are received in biasing grooves 412a and 412b. The biasing members 420 exert a biasing force on the gate valve cover 412 so cutting blades 411 are biased to engage the rotary gate valve 606. In one embodiment, cutting blades 411 are positioned on each side of an opening 412c in the gate valve cover, although only one blade 411 can be seen in the view in FIG. 4B. The blades 411 cut meat pieces as the rotary gate valve 606 is rotated. The gate valve cover 412 is further designed to be received in the opening 404b of the metering block 404. Threaded studs 429 couple the gate block 602 of the rotary gate valve assembly 600 to the main housing metering block 404 of the controlled product dispensing assembly 401. In particular, threaded ends of the threaded studs 429 engage threaded bores (not shown) in the metering block 404 while the other end of the threaded studs 429 pass through passages 640 in the gate block 602. Wing nuts 428 then engage further threads on the threaded studs 429. In addition, threaded fasteners 426 are further used to connect the gate block 602 to the metering block 404. In particular, heads of the fasteners 426 received in side cavities 602f (an identical cavity, not shown, is on the other side of the block gate 602) of the gate block 602 engage a surface of the gate block 602 in the side cavities 602f and the threaded portions of the fasteners 426 engage threaded bores (not shown) in the metering block 404. To help align the gate block 602 with the metering block 404, posts 616a and 616b that are partially received in bores 601a and 601b of the gate block 602 (as illustrated FIG. 6C) are received in corresponding bores (not shown) in the metering block 404.

Figure 5A:
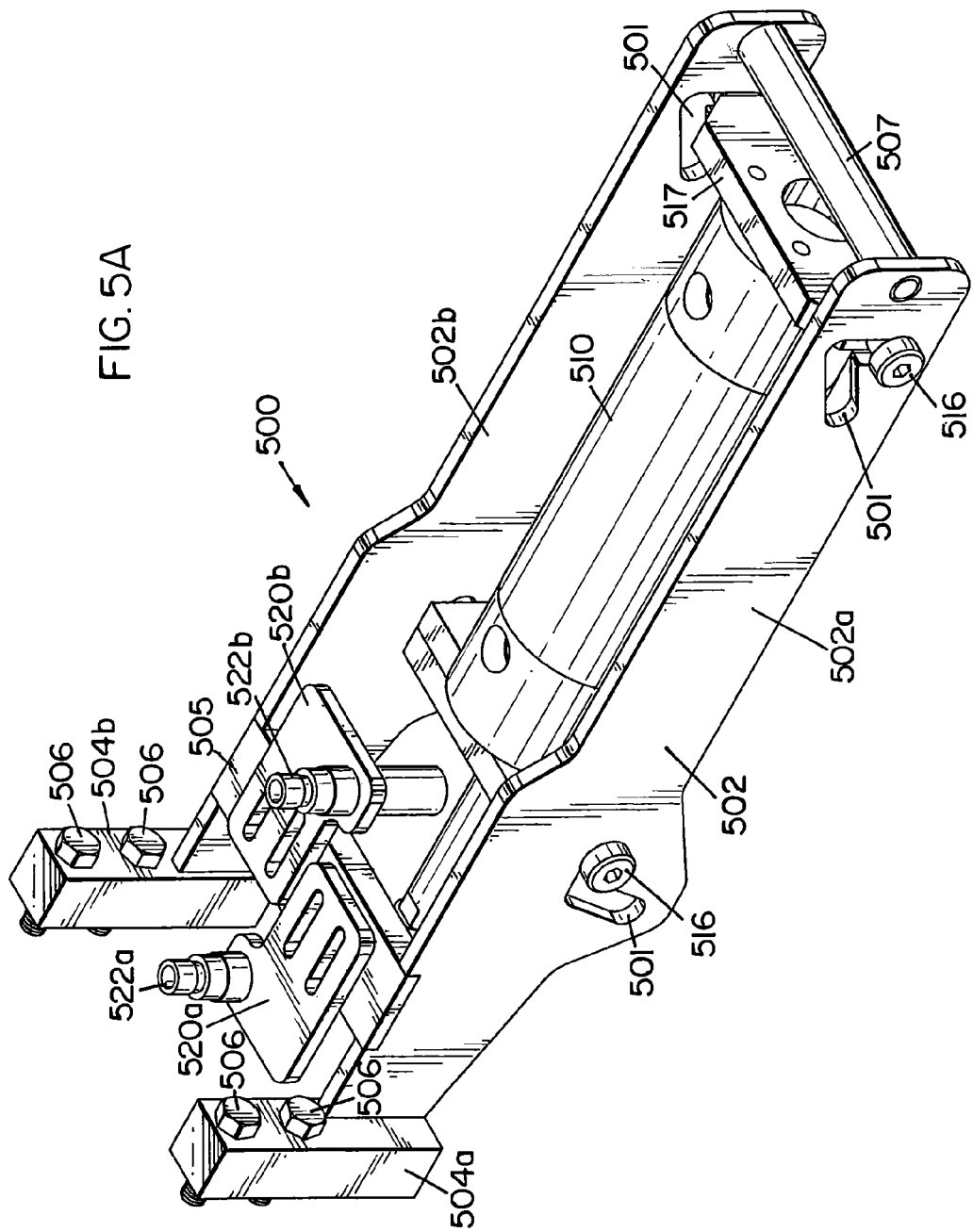
FIG. 5A is a side perspective view of a gate control assembly of one embodiment of the present invention.
Figure 5B:
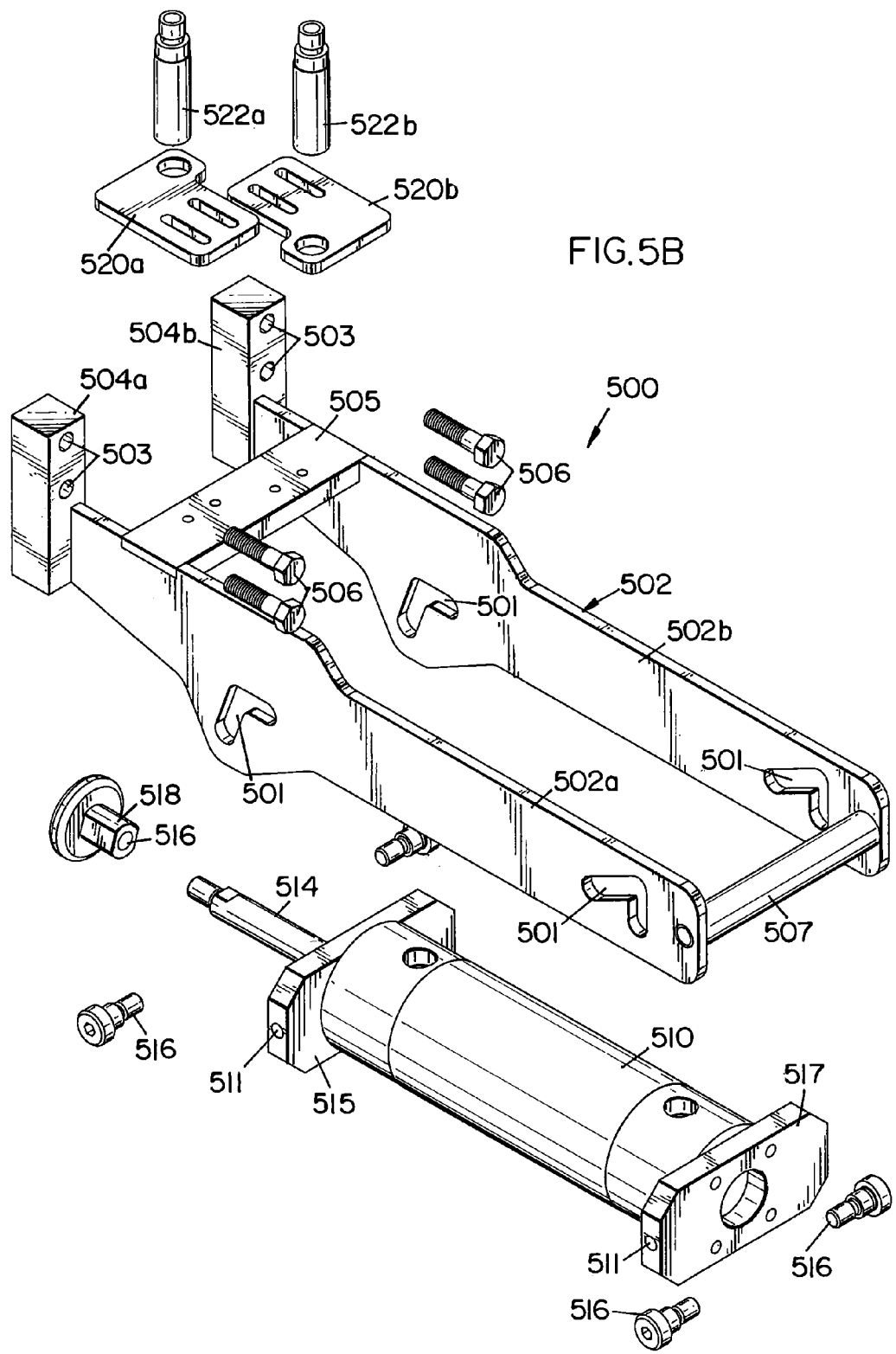
FIG. 5B is an exploded side perspective view of the gate control assembly of FIG. 5A.

The gate control assembly 500 is further illustrated in FIG. 5A and FIG. 5B. The gate control assembly 500 includes a gate frame 502 and a gate plate actuator 510. The gate frame 502 includes first and second side panels 502a and 502b. The side panels 502a and 502b are spaced apart from each other with a first spacer 507 and a second spacer 505. The first spacer 507 is positioned proximate first ends of the first and second side panels 502a and 502b and the second spacer 505 is positioned proximate second ends of the first and second side panels 502a and 502b. Each side panel 502a and 502b includes a pair of retaining track passages 501. The gate plate actuator 510 extends between a first end mounting plate 515 and a second end mounting plate 517. The first end mounting plate 515 and the second end mounting plate 517 each include a pair of opposed threaded bores 511. Fasteners 516 threadably engage the threaded bores 511 to couple the gate plate actuator 510 within the gate frame 502. In one embodiment, the fasteners 516 are shoulder fastening screws having their shoulder portion received in retaining track passages 501 of the respective first and second side panels 502a and 502b of the gate frame 502. The gate plate actuator 510 further includes an actuator rod 514 that is operatively coupled to move in and out as the gate plate actuator 510 is activated. An end of the actuator rod 514 includes threads. A foot portion 518 having a threaded inner bore 516 is threadably engaged with the threads on the end of the actuator rod 514. The foot portion 518 is further received in the cutout connection portion 408b of the gate plate 408. Hence, when the gate plate actuator 510 moves the actuator rod 514 the gate plate 408 is also moved. Mounting member brackets 504a and 504b coupled to the respective ends of the first and second side plates 502a and 502b proximate the second spacer 505 are used to mount the gate control assembly 500 to the main housing metering block 404. In particular, fasteners 506 passing through mounting bores 503 in the respective mounting member brackets 504a and 504b engage threaded bores 431 in the main housing metering block 404 to couple the gate control assembly 500 to the main housing metering block 404.

The gate control assembly 500 further includes first and second sensor brackets 520a and 520b that couple gate plate inductive sensors 522a and 522b to the second spacer 505. The gate plate inductive sensors 522a and 522b are positioned to sense the location of the foot portion 518. In particular, sensor 522a is positioned to sense the foot portion 518 when the product passage 408a of the gate plate 408 is aligned with the inner passage 404a of the main housing metering block 404 to allow product to pass though the product passage 408a of the gate plate 408 to a container. Sensor 522b is positioned to sense the location of the foot portion 518 when the gate plate 408 is positioned to block the inner passage of the 404a of the main housing metering block 404 to prevent the discharge of product. The first and second sensors 522a and 522b are in communication with controller 802 as discussed below and provide signals to the controller 1002 when the foot portion 518 is sensed. Based on the received signals, the controller 1002 controller coordinates the operation of the metering product delivering system 100 including the gate plate actuator 510 as discussed below. In one embodiment, the gate plate actuator 510 is an air actuator.

In FIGS. 3A, 3B and 3C, the metering control assembly 300 of one embodiment of the metered valve assembly 400 is illustrated. The metered control assembly 300 includes a stand 302. The stand 302 includes first and second stand legs 302a and 302b that are spaced apart from each other with a lower horizontal support 302e and an upper horizontal support plate 302c. Each of the first and second stand legs 302a and 302b includes a connection aperture 301a and 301b respectively. The connection apertures 301a and 301b are used to couple stand 302 to the frame 120 of the metering product delivery pump system 100. The stand 302 further includes a plurality of vertical supports 302d that extend between the lower horizontal support 302e and the upper horizontal plate 302c. The upper horizontal plate 302c in this embodiment includes a plurality of passages 307 and bores 303. The metering control assembly 300 further includes a metered dose actuator 301 that is contained in metered actuator housing 304. The metered actuator housing 304 includes a lower flange mount 303 with spaced bores 305. An actuator rod 320 extends from a lower portion of the metered dose actuator 301. The actuator rod 320 includes a threaded end. The flange mount 303 of the metered actuator housing 304 is coupled to a central portion of the upper horizontal plate 302c such that the actuator rod 320 is received in a central passage 307 of the upper horizontal plate 302c of the stand 302. In particular, the bores 305 in the flange mount 303 are aligned with respective bores 303 in the upper horizontal plate 302c while fasteners (not shown) passing through the respective bores 305 and 303 couple the metered actuator housing 304 to the upper horizontal plate 302c of the stand 302. In an embodiment described below in relation to FIG. 8A that has three different metered valve assemblies 400, each metered valve assembly 400 will have a respective metered dose actuator assembly 301 with a housing 304 that is attached to the upper horizontal plate 302c and an actuator rod 302 passing through a respective passage 307 in the upper horizontal plate 302c.

Referring to FIG. 3C, a cylinder foot 306 having a threaded bore 311 threadably engages the threaded end of the actuator rod 320. The cylinder foot 306 includes an extended signaling arm 306a. A wear block 308, positioned between a pair of the vertical supports 302d, receives a portion of the cylinder foot 306 to prevent the actuator rod 320 from rotating. A bracket 310 is coupled to the wear block 308. A metered dose inductive sensor 330 is coupled to bracket 310. The metered dose sensor 330 is positioned to detected a hex bolt 407 on a piston assembly 405 received in the cylinder 402 that would indicate that product has filled up the dispensing cylinder 402. The hex bolt 407 and the piston assembly 405 are illustrated in FIG. 2B. A starting reference inductive sensor 332 is coupled to one of the vertical supports 302d. The starting reference sensor 332 senses when the extended signaling arm 306a of the cylinder foot 306 is near which is used to find a starting reference when the metering product delivery system 100 is first started. Upon the detection of signaling arm 306a, the starting reference sensor 332 sends a signal to the controller 800 that the piston assembly 405 is at the starting reference point. The cylinder foot 306 is positioned above the dispensing cylinder 402 of the metering valve control assembly 400 and is coupled to the piston assembly 405. As the dispensing cylinder 402 fills with or is drained of product, the top portion of the dispensing cylinder coupled to the piston assembly 405 moves up or down accordingly. As the top portion of the dispensing cylinder moves up or down, the actuator rod 320 coupled to the cylinder foot 306 also moves up and down thereby moving the extended signaling arm 306a. Electrical connectors 330a and 330b illustrated in FIG. 3A are used to the control the metered actuator 301. When the metered dose sensor 330 senses the piston is at the top of cylinder 402, indicating product has filled the cylinder and is ready to be delivered, the metered actuator 301 is activated by the controller 1002, as described below, to deliver product. In one embodiment, the metered actuator 301 includes a built in actuator position sensor 333 that sends signals to the controller 1002 regarding the position of the metered actuator 301.

Figure 7A:
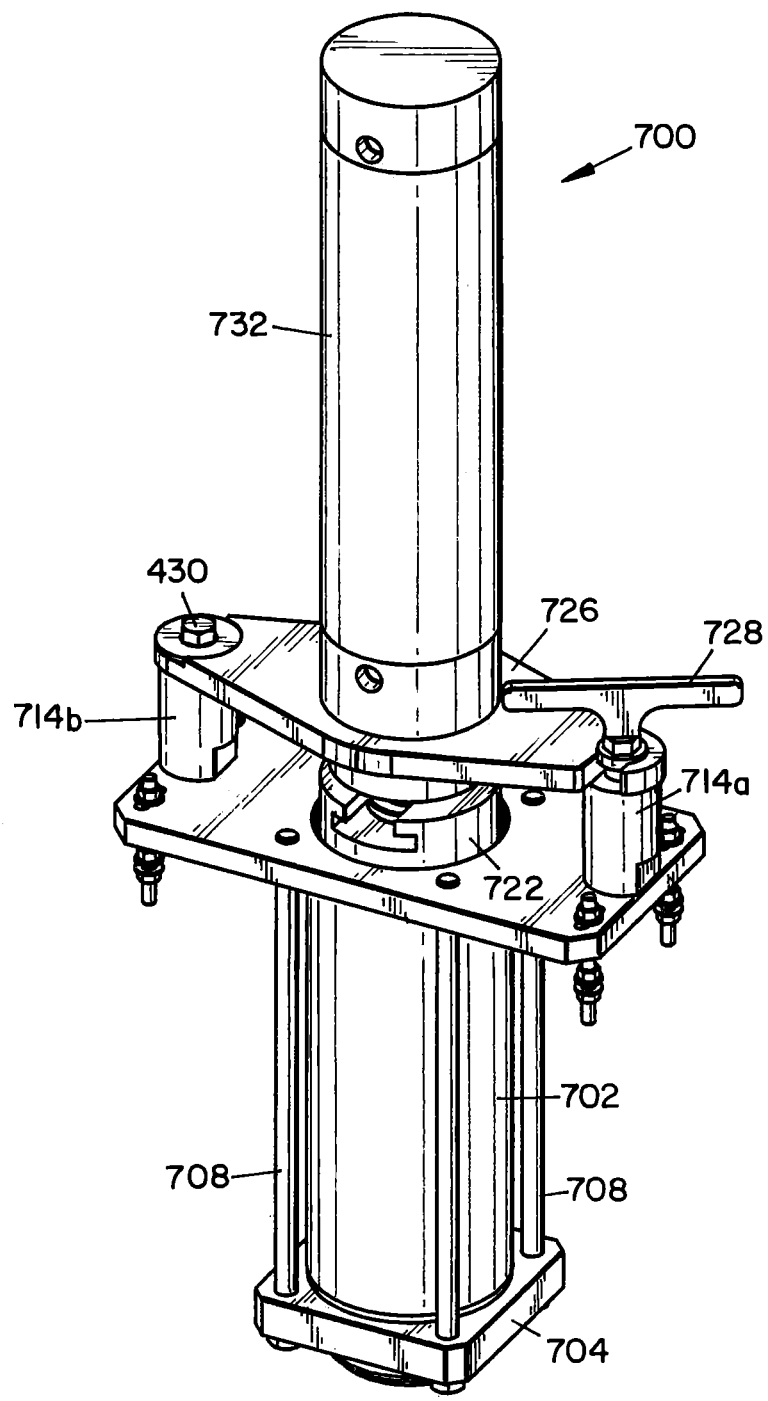
FIG. 7A is a side perspective view of a product accumulator assembly of one embodiment of the present invention.
Figure 7B:
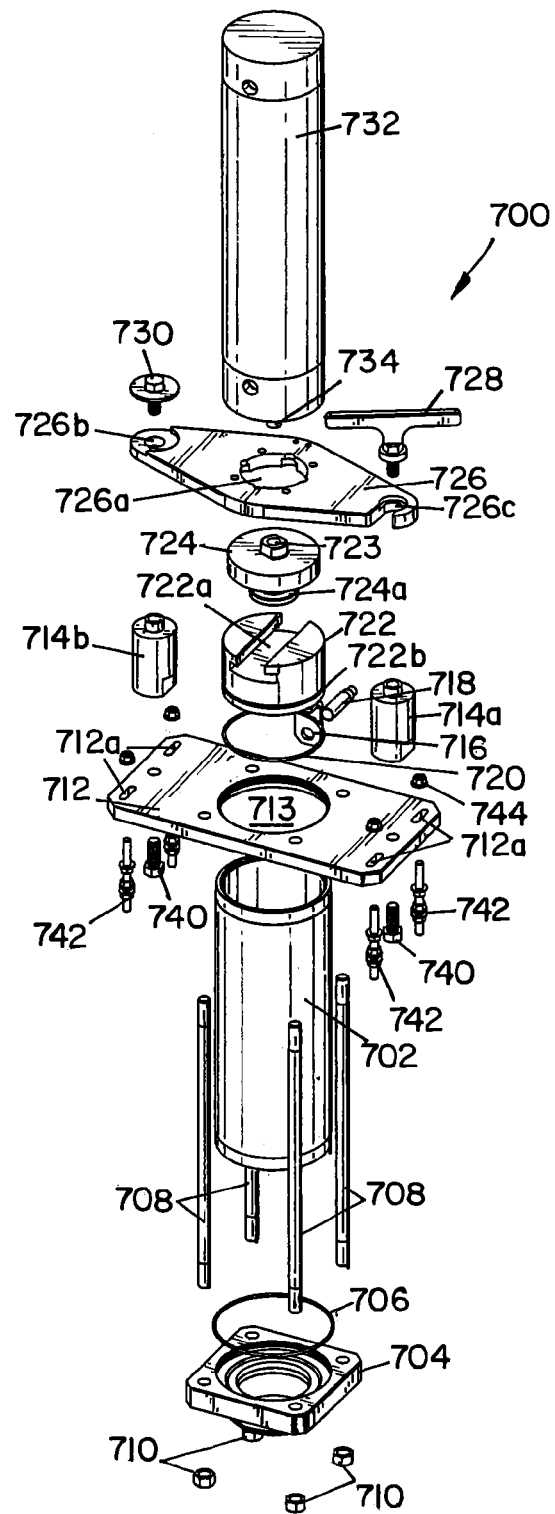
FIG. 7B is an exploded side perspective view of the product accumulator assembly of FIG. 7A.

FIGS. 7A and 7B illustrate product accumulator assembly 700 of one embodiment. The product accumulator assembly 700 includes a product accumulator cylinder 702 that is designed to hold product. The product accumulator cylinder 702 has a first end that is connected to a base 704. An O-ring 706 is positioned between the base 704 and the first end of the product accumulator cylinder 702 to create a seal. The product accumulator assembly 700 also includes a top plate 712. The top plate 712 includes a central passage 713. A second end of the product accumulator cylinder 702 is aligned with the central passage 713 of the top plate 712. A plurality of tie rods 708, spaced around the product accumulator cylinder 702, are coupled between the base 704 and the top plate 712 via nuts 710 to provide support for the assembly 700. The product accumulator assembly 700 also includes an accumulator actuator 732 and a foot cylinder bracket 726. The accumulator actuator 7302 includes an actuator rod 734 that extends from a lower end of the actuator 732. The actuator rod 734 has a threaded end. The foot cylinder bracket 726 includes a central passage 726a and also a bore 726b and an opposed positioned slot 726c. The actuator rod 734 of the accumulator actuator 732 is received in the central passage 726a of the foot cylinder bracket 726. The foot cylinder bracket 726 is coupled to the top plate 712 via spacers 714b and 714b. In particular, spacers 714a and 714b are coupled through spaced bores in the top plate 712 via fasteners 740 and the spacers 714a and 714b are coupled to the foot cylinder bracket 726 via a respective wing bolt 728 and fastener 730. In particular, wing bolt 728 is received in slot 726c of the foot cylinder bracket 726 and fastener 730 passes through bore 726b, to couple the foot cylinder bracket 726 to the spacers 714a and 714b. A plurality of fastening posts 742 are coupled in slots 712a in the top plate 712 with nuts 744. The threaded end of actuator rod 734 is coupled to a threaded bore 723 of a foot 724. The foot 724 includes a guide portion 724a. The guide portion 724a is received in a track 722a of a piston 722. The piston 722 includes a groove 722b in which an O-ring 720 is received. The piston 722 passing through the central passage 713 of the top plate 712 is received in the product accumulator housing 702. The accumulator actuator 732 dynamically positions the piston 722 within the product accumulator cylinder 702. The product accumulator 700 further includes a product accumulator inductor sensor 718 that is coupled to the foot cylinder bracket 726 via sensor bracket 716. Inductor sensor 718 is positioned to sense the position of the foot 724 when the foot 724, coupled to the piston 722, is near. When the foot 724 is near, inductor sensor 718 sends a signal to the controller 1002 as discussed below. Based on the dynamic positioning of the piston 722 in the product accumulator cylinder 702, product is either drawn in or pushed out of the product accumulator cylinder 702.

Figure 2A:
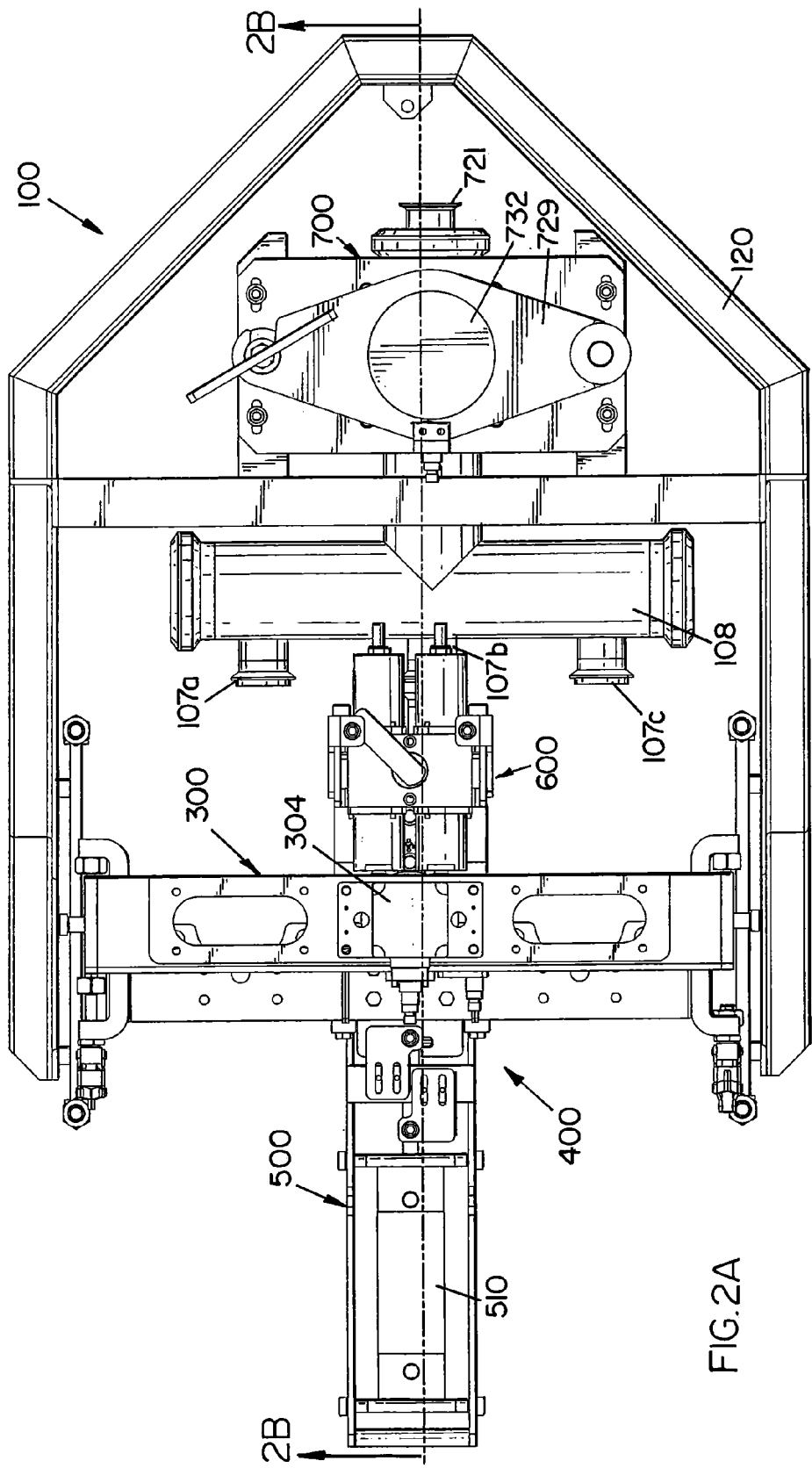
FIG. 2A is a top view of the metering product delivery pump system of FIG. 1.
Figure 2B:
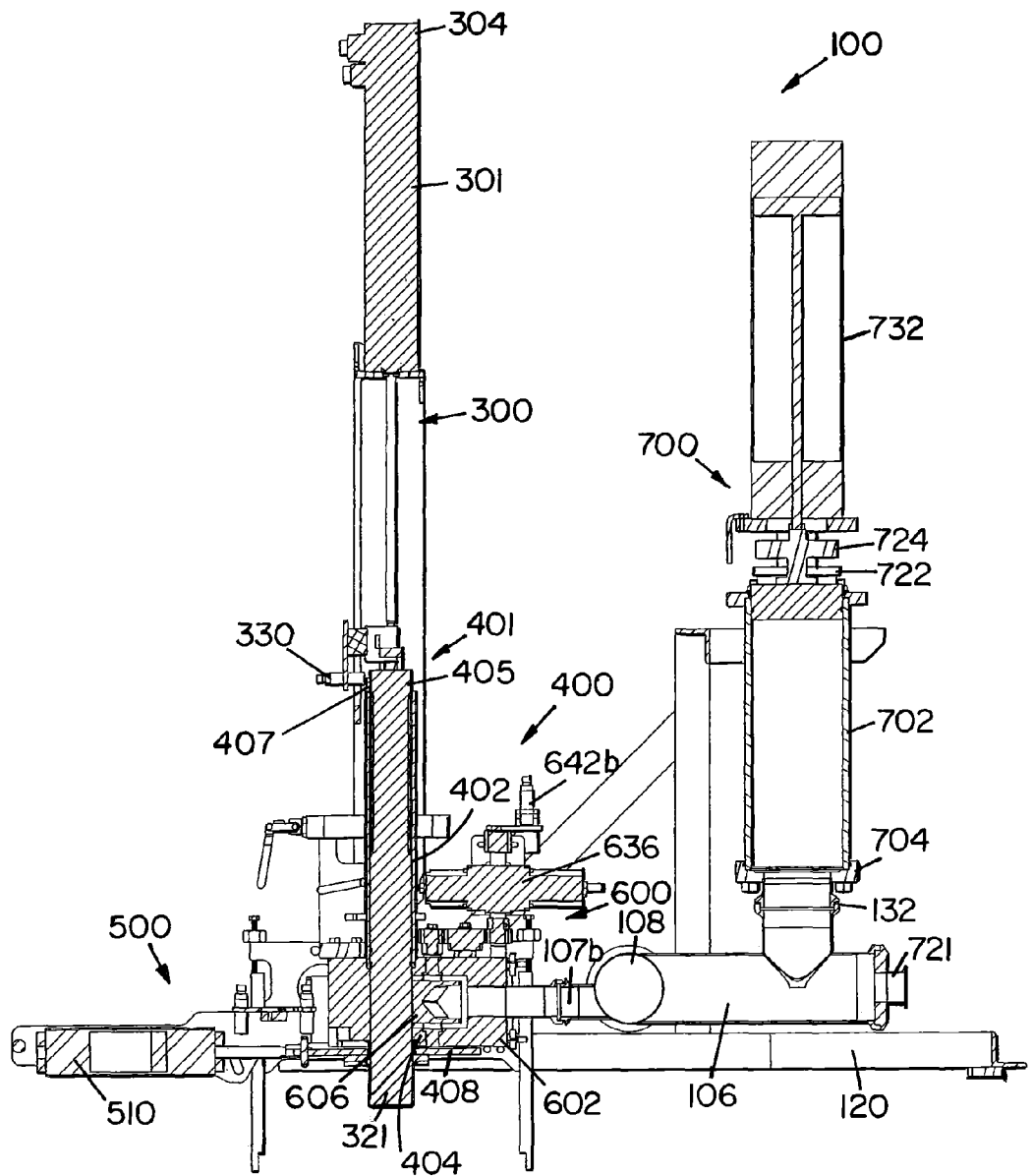
FIG. 2B is a cross-sectional view of the metering product delivery pump system along line 2B-2B of FIG. 2A.

Referring to FIGS. 2A and 2B, the metering product delivery pump system 100 is further described. An input connection 721 connects product to a first product flow pipe 106. A coupler connection 132 provided a fluid communication coupling between a side of the first product flow pipe 106 and the base 704 of the product accumulator assembly 700. Product will flow into the product accumulator cylinder 702 as the piston 722 moves up in the cylinder 702. Product is pushed out of the cylinder 702 when piston 722 is pushed down by the accumulator actuator 734. The product flow pipe 106 is further coupled to a distribution tube 108 that is in turn coupled to deliver product to the rotary gate valve assembly 600. As discussed above, the positioning of the rotary gate valve 606 of the rotary gate valve assembly 600 selectively passes product to the dispensing cylinder 402 of the controlled product dispensing assembly 401. A piston assembly 405 received in the dispensing cylinder 402 selectively delivers product out of an output 321 of the piston assembly 405. In FIG. 2B, the metering product delivery pump system 100 is in a configuration to dispense product out of the piston assembly output 321. In particular, the gate control assembly 500 has moved the gate plate 408 so the product passage 408a in the gate plate 408 is aligned with the piston assembly 405.

Figure 8A:
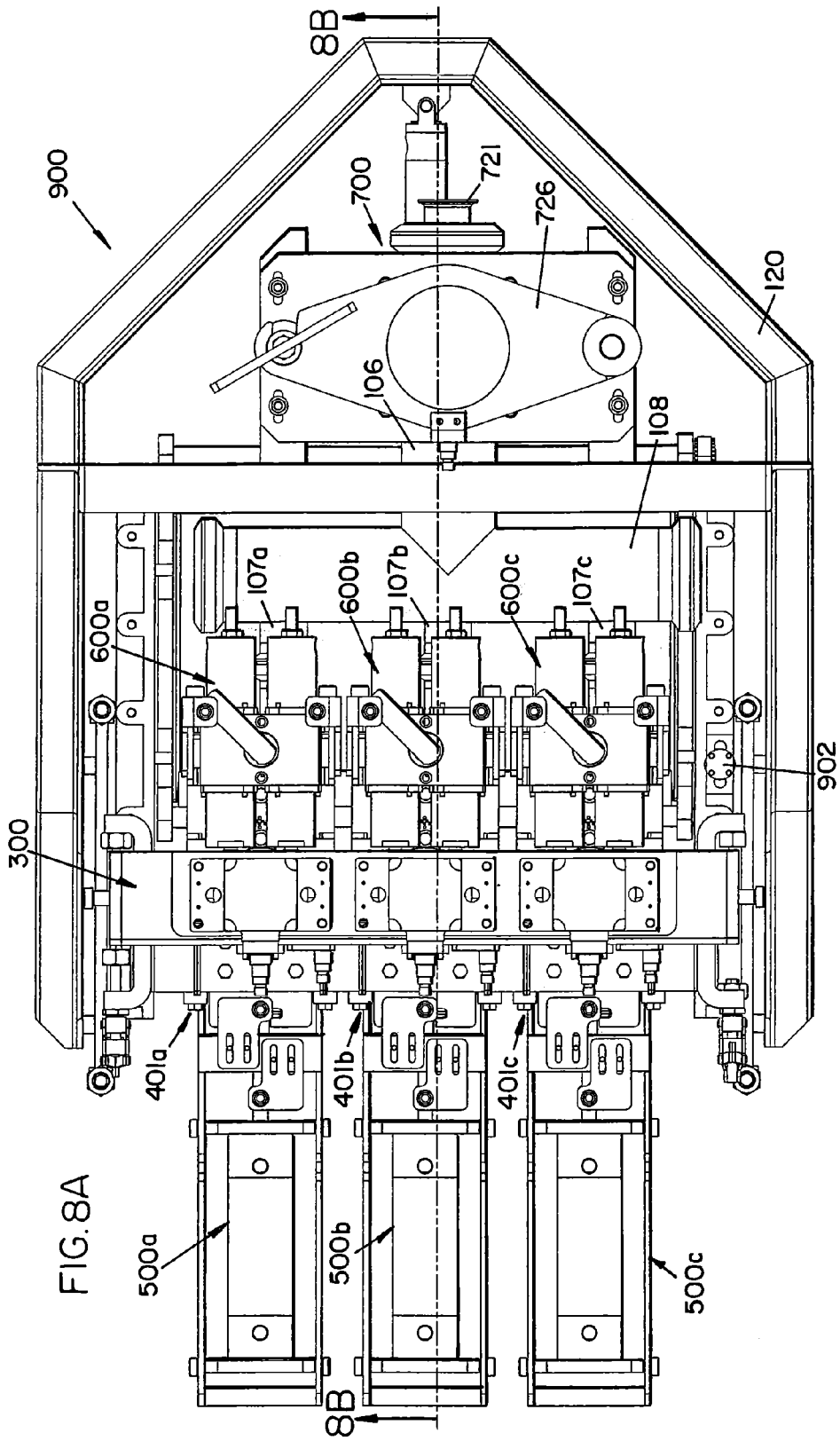
FIG. 8A is a top view of another embodiment of a metering product delivery pump system of the present application.
Figure 8B:
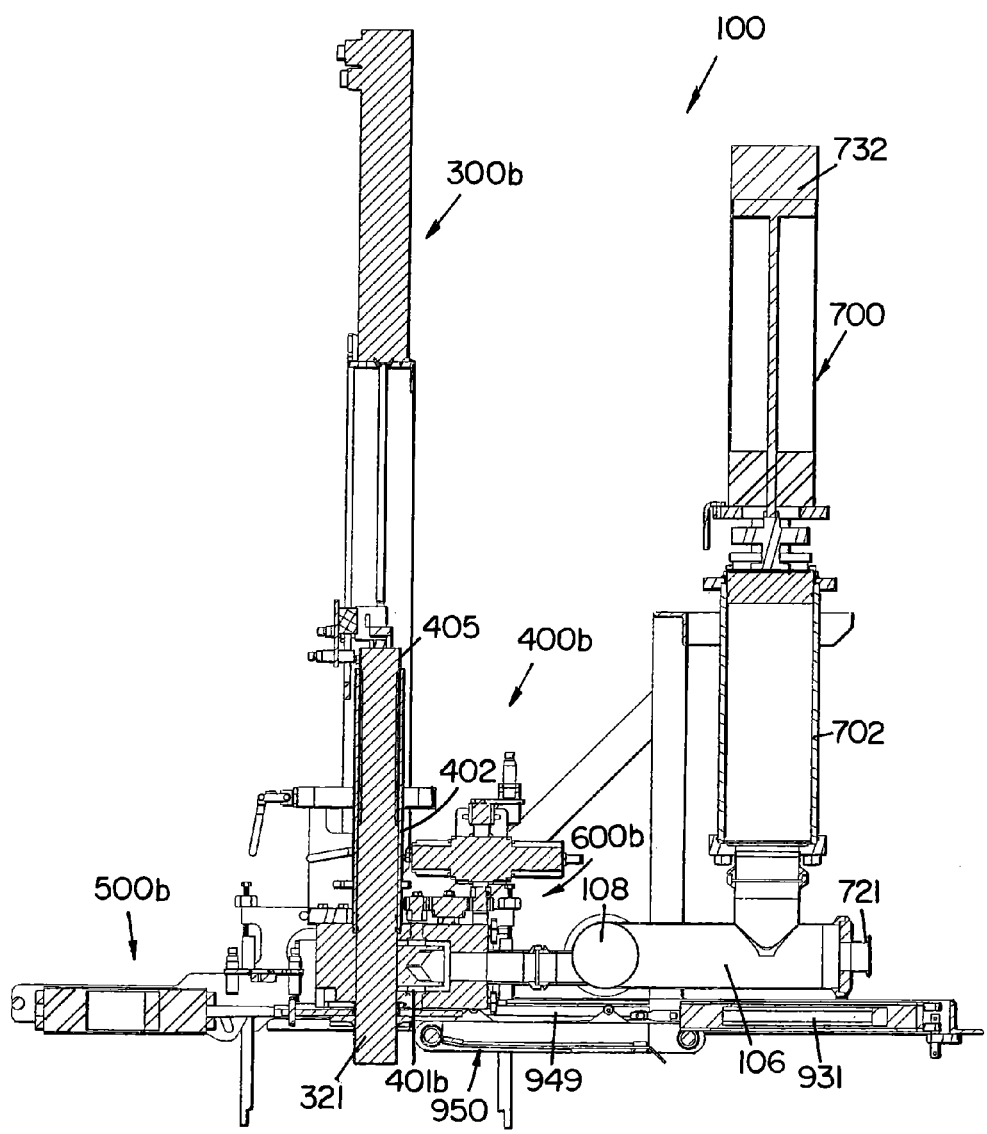
FIG. 8B is a cross-sectional view of the metering product delivery pump system along line 8B-8B of FIG. 8A.

Another embodiment of a metering product delivery pump system 900 is illustrated in the top view of FIG. 8A. In this embodiment, three different metering valve control assemblies 400a, 400b and 400c are used so that three different product packages can be filled at the same time. Each of the metering valve control assembly 400a, 400b and 400c is similar to the metering valve assembly 400 described above. Each metering valve assembly 400a, 400b and 400c includes a rotary gate valve assembly 600a, 600b and 660c, a controlled product dispensing assembly 401a, 401b and 401c and a gate control assembly 500a, 500b and 500c similar to the rotary valve assembly 600, the controlled product dispensing assembly 401 and the gate control assembly 500 described above. In this embodiment, three connection pipes 107a, 107b and 107c are coupled to the distribution tube 108 to feed the respective rotary gate assemblies 600a, 600b and 600c. FIG. 8B illustrates a cross-sectional view of the metering product delivery pump system 900 along line 8B-8B of FIG. 8A. As illustrated, along the cross-sectional view, the metering product delivery pump system 900 is similar to the metering product delivery pump system 100 illustrated in FIG. 2B.

One difference between metering product delivery pump system 100 and the metering product delivery pump system 900 is the addition of a drip tray assembly 950 as illustrated in FIG. 8B. The drip tray assembly 950 selectively covers and prevents product from dripping from the outputs 321 of each metering valve control assembly 400a, 400b and 400c when the metering product delivery pump system 900 is in a non-dispensing mode of operation. The drip tray assembly 950 is illustrated in a dispensing mode position in FIG. 8B. In this mode of operation, product (not shown) is being dispensed out of the output 321 into a package (not shown). The drip tray assembly 950 in this mode is pulled back by a drip tray assembly actuator 931 that is controlled by a controller 1002 discussed below. Once the piston assembly 405 retracts via the metering control assembly 300, the drip tray assembly 950 is moved by the drip tray assembly actuator 931 to be directly under the respective piston assembly output 321 to prevent the unintentional discharge of product.

Figure 9C:
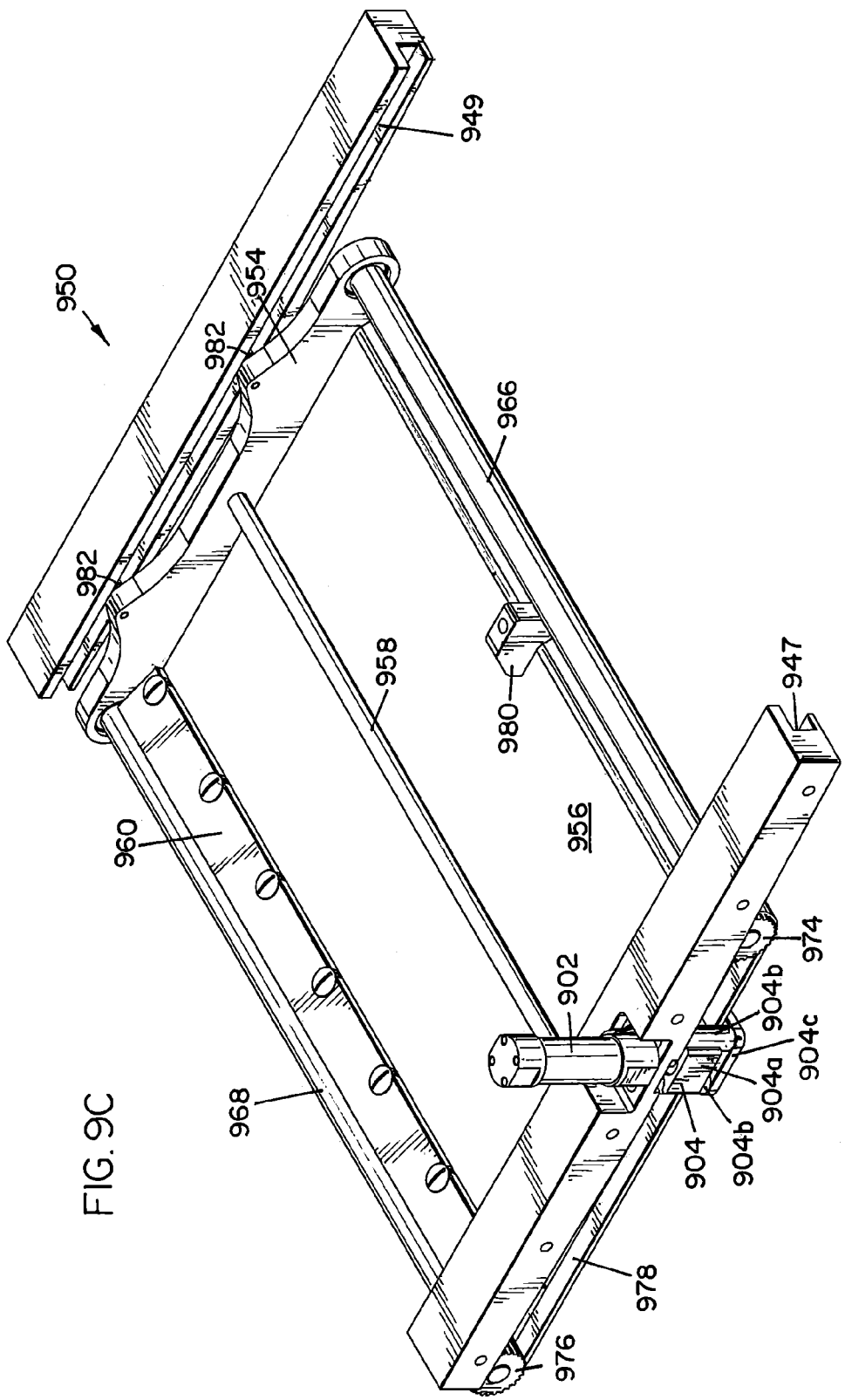
FIG. 9C a side perspective view of the drip pan of FIG. 9A and a belt actuator of an embodiment.

An example of a drip tray assembly 950 is illustrated in the side view of FIG. 9A and the exploded side view of FIG. 9B. The drip tray assembly 950 includes a drip pan 956 to hold product. The drip pan 956 is coupled between a first side plate 952 and a second side plate 954. The drip pan 956 has a first edge 956a (or back edge) and a second edge 956b (or front edge). An actuator connector 980 is centrally coupled approximate the first edge 956a of the drip pan 956. The actuator connector 980 is then in turn coupled to the drip tray assembly actuator 931. Approximate the second edge 956b of the drip pan 956 is a plurality of spaced threaded bores 961. An elongated scraper portion 960 having a plurality of scraper slots 964 spaced along a first edge is selectively coupled to the drip pan 956 via fasteners 962 passing through the slots 964 and engaging respective spaced threaded bores 961 in the drip pan 956. A second edge of the scraper portion 960 engages a drive shaft 968 as discussed below. The first side plate 952 includes end apertures 952a and 952b that are positioned approximate opposed ends of the first side plate 952. In one embodiment the end apertures 952a and 952b are counter sunk. The first side plate 952 further includes a top edge 951a and a bottom edge 951b. The top edge 951a has two spaced portions 991a and 991b that extend upward. Each of the two spaced portions 991a and 991b include roller connection threaded apertures 952c. Roller assemblies 982 that include threaded shafts are threadably engaged with respective roller connection threaded apertures 952c. The roller portions of the roller assemblies 982 are received in track 949 (shown in FIGS. 8B and 9C) that guide the drip tray assembly 950. The second side plate 954 includes end apertures 954a and 954b that are positioned approximate opposed ends of the second side plate 954. In one embodiment the end apertures 954a and 954b are counter sunk. The second side plate 954 further includes a top edge 953a and a bottom edge 953b. The top edge 953a has two spaced portions 993a and 993b that extend upward. Each of the two spaced portions 993a and 993b includes roller connection threaded apertures 954c. Roller assemblies 982 that include threaded shafts are threadably engaged with respective roller connection threaded apertures 954c. The roller portions of the roller assemblies 982 are received in 947 track (shown in FIG. 9C) that guide the drip tray assembly 950. A support rod 958 is centrally coupled between the first side plate 952 and the second side plate 954.

The drip tray assembly 950 further includes first and second drive shafts 966 and 968. The first drive shaft 966 is received within end aperture 952a of the first side plate 952 and end aperture 954a of the second side plate 954 to position the first draft shaft 966 proximate the first edge 956a of the drip pan 956. A bearing 970 is received in each end aperture 952a and 954a to allow rotation of the first drive shaft 966 in relation to the drip tray assembly 950. As discussed above, each end aperture 952a and 954a is counter sunk to keep the bearing 970 from passing through one side of the respective apertures 952a and 954a. Each aperture 952a and 954a further includes an inner groove that receives a C-clip 972 that prevents the bearings 970 from passing through another side of the respective apertures 952a and 954a. Hence, the bearings 970 are retained in the respective apertures 952a and 954a. The second drive shaft 968 is received within end aperture 952b of the first side plate 952 and end aperture 954b of the second side plate 954 to position the second draft shaft 968 proximate the second edge 956b of the drip pan 956. A bearing 970 is received in each end aperture 952b and 954b to allow rotation of the second drive shaft 968 in relation to the drip tray assembly 950. As discussed above, each end aperture 952b and 954b is counter sunk to keep the bearing 970 from passing through one side of the respective apertures 952b and 954b. Each aperture 952b and 954b further includes an inner groove that receives a C-clip 972 that prevents the bearings 970 from passing through another side of the respective apertures 952b and 954b. Hence the bearings 970 are retained in the respective apertures 952b and 954b.

First ends 966a and 968a of each of the first and second drive shafts 966 and 968 are positioned in the respective apertures 954a and 954b of the second side panel 954. Second ends 966b and 968b of each of the first and second drive shafts 966 and 968 extend out beyond the first side panel 952. Pulleys 974 and 976 are coupled to the respective second ends 966a and 968a of the first and second drive shafts 966 and 968. An endless looped belt 978 is in rotational communication with the pulleys 974 and 976 so that the rotation of the second drive shaft 968 is locked onto the rotation of the first drive shaft 966. The belt 978 is shown having a top portion 978a and a bottom portion 978b. Referring to FIG. 9C, a side perspective view of the drip pan 950 and tracks 947 and 949 attached to the frame 120 is illustrated. FIG. 9C further illustrates a belt actuator 902 that is further coupled to the frame 120. In one embodiment, the belt actuator 902 is an air cylinder. The belt actuator 902 is under control of the controller 1002 as discussed below. The belt actuator 902 includes a belt engaging assembly 904. The belt engaging assembly selectively engages the top portion 978a of the belt 978 or the bottom portion 978b of the belt 978 under the direction of the controller 1002. In one embodiment, the belt engaging portion 904 includes a movable engaging portion 904a (which is coupled to move with activation of the belt actuator 902), a plurality of spacers 904b and a bottom engaging plate 904c. In use, when the drip tray assembly 950 is being moved in the direction to cover the output 321 of the metered valve assembly 400, the belt actuator 902 causes the belt engaging assembly 904 to engage (or clamp down on) the top portion 978a of the belt 978. In particular, the movable engaging portion 904a of the belt engaging portion 904, in one embodiment, moves up to clamp the top portion 978a of the belt 978 between movable engaging portion 904a and a bottom portion of the rail 947 coupled to the frame 120. Since the belt engaging assembly 904 of the belt actuator 902 is statically connected to the frame 120, friction between the belt engaging assembly 904 and the belt 978 causes the pulleys 974 and 976 to rotate clockwise as the drip tray assembly 950 is being positioned to cover the output 321. This clockwise rotation of the pulleys 974 and 976 cause drive shaft 968 to rotate clockwise which directs any drips falling on drive shaft 968 onto the scraper portion 960 of the drip pan assembly 950 and into the drip pan 956. When the drip tray assembly 950 is being moved away from the output 321, the belt engaging assembly 904 is activated to engage (or clamp down on) the bottom portion 978b of the belt 978. In particular, the movable engaging portion 904a of the belt engaging portion 904, in one embodiment, moves down to clamp the bottom portion 978b of the belt 978 between movable engaging portion 904a and the bottom engaging plate 904c of the belt engaging portion 904. Here again, since the belt engaging assembly 904 of the belt actuator 902 is statically connected to the frame 120, friction between the belt engaging assembly 904 and the bottom portion of the belt 978 causes the pulleys 976 to rotate clockwise as the drip tray assembly 950 is being pulled away from the output 321. As discussed above, the clockwise rotation of the pulleys 974 and 976 cause the drive shaft 968 to rotate clockwise which directs any product drips on drive shaft 968 onto the scraper portion 960 of the drip pan assembly 950 and into the drip pan 956.

Figure 10:
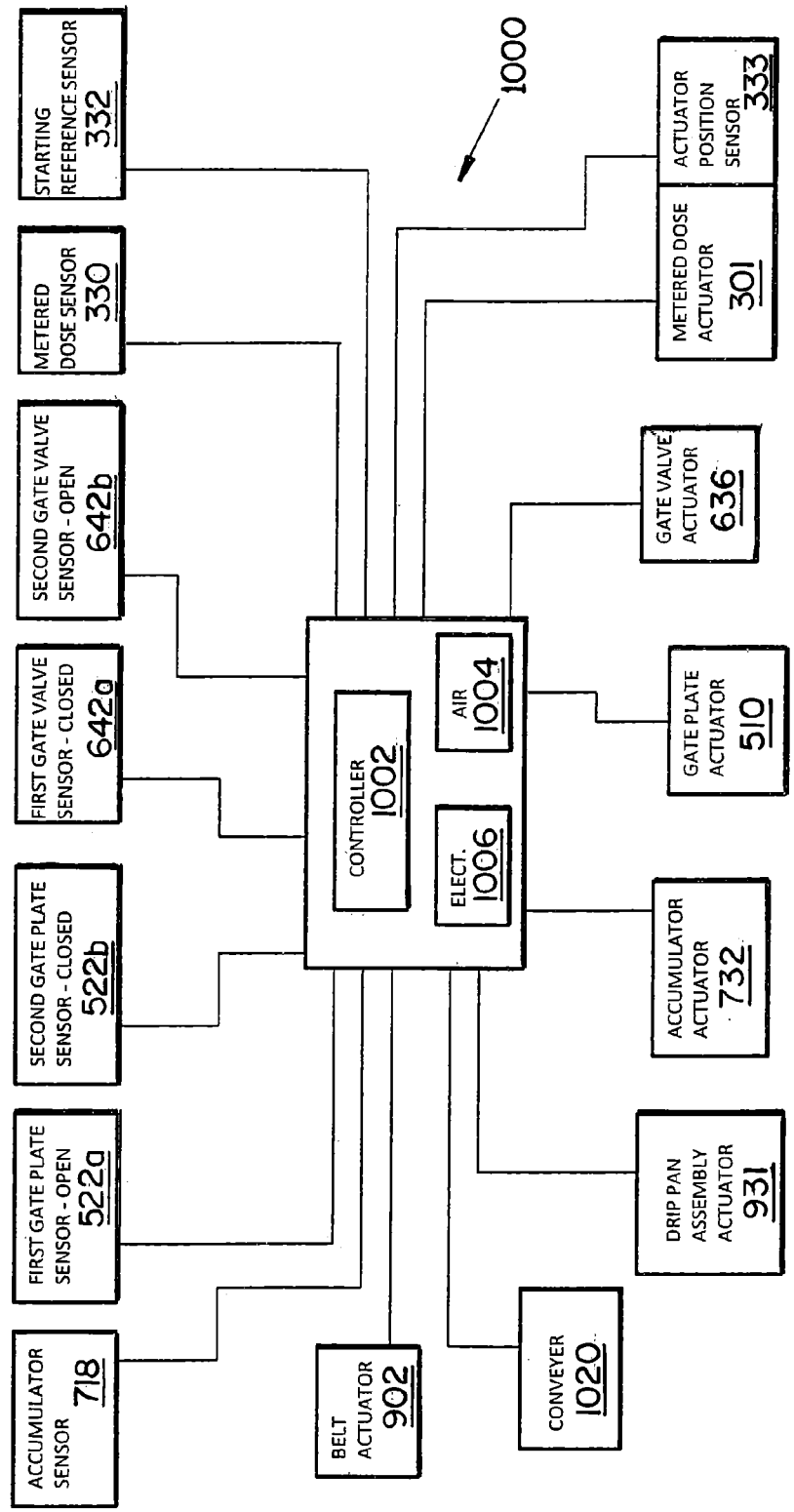
FIG. 10 is a block diagram of an operating system of one embodiment of the present invention.

FIG. 10 illustrates an example block diagram of a metering product delivery pump system 1000 of an embodiment. As illustrated, the system 1000 includes a controller 1002 that is designed to control the respective actuators 301, 636, 510, 732 and 951 based at least in part on signals from sensors 332, 330, 642b, 642a, 522b, 522a, and 718. In embodiments, the controller 1002 implements either an electrical source 1006 or and air source 1004 to activate the actuators 301, 636, 510, 732 and 951 depending on the actuator type. Referring to the cross-sectional views in FIGS. 2B and 8B and the Block diagram of FIG. 10 an explanation of the operation of a metering product delivery pump system 1000 of an embodiment is provided. During an initial cycle, product coupled to the input 721 is received into the first product pipe 106 and the product accumulator assembly 700. At this point the rotary gate valve 606 of the rotary gate valve assembly 600 is closed so pressure builds up in the product accumulator assembly 700. The controller verifies that the rotary gate valve 606 is in the closed position with a signal from the first gate valve sensor 642a that indicates the rotary gate valve is in the closed position. The pressure causes the piston 722 in the product accumulator housing 702 (cylinder) of the product accumulator assembly 700 to rise. When the piston 722 reaches the top of the cylinder 702, the accumulator sensor 718 senses the position and sends a signal to the controller 1002. At this point, the controller 1002 activates the gate valve actuator 636 to turn the rotary gate valve 606 to the open position. Once the controller 1002 confirms the rotary gate valve 606 is in the open position with a signal from the second gate valve sensor 642b, the controller 1002 activates the accumulator actuator 732 to cause the piston 722 in the cylinder 702 to go downward therein pushing the product through the first product pipe 106, the distribution tube 108 and through the rotary gate assembly 600. As discussed above, in regards to the embodiment of FIG. 8B, the distribution tube 108 may be coupled to several rotary gate assemblies 600a, 600b and 600c of respective metering valve control assemblies 400a, 400b and 400c. With the multiple metering valve assemblies 400a, 400b and 400c, the controller 1002 is coupled to control each assembly 400a, 400b and 400c. The description is further described as if only one metering valve assembly 400 is used for simplicity. However it will be understood that the controller 1002 similarly controls multiple metering valve assemblies 400a, 400b and 400c.

Before the rotary gate valve 606 is open, the controller 1002 confirms the piston assembly 405 of the controlled product dispenser assembly 401 is above the rotary gate valve 606. The controller 1002 confirms the position of the piston assembly 401 is above the rotary gate valve via signals from the actuator position sensor 333 that detects the position of the metered dose actuator 301. Also, the controller 1002 verifies the gate plate 408 is in the closed position to prevent product from unintentionally dispensing from the controlled product dispensing assembly 401 by detecting a signal from the second gate plate sensor 522b. It is noted that in FIGS. 2B and 8B, the metering product delivery pump systems 100 and 900 are illustrated in dispensing orientations with the piston assembly 401 passing through the product passage 408a of the gate plate 408 and in system 900 with the drip tray assembly 950 pulled back. When the rotary gate valve 606 is opened, product pushes the piston assembly 401 up the dispensing cylinder 402 of the controlled product dispensing assembly 401 until the metered dose sensor 330 of the metering control assembly 300 detects the piston assembly 401 has reached its full position that indicates a select dose amount of product has been received in the dispensing cylinder 402. When the controller 1002 receives the signal from the metered dose sensor 330, the controller 1002 activates the gate valve actuator 636 to close the rotary gate valve 606. In system 900, the controller 1002 then activates the drip pan assembly actuator 931 to move the drip pan 950 away from the output 321 of the controlled product dispensing assembly 401 and the belt actuator 902 to rotate drive shaft 968 to direct any drips of product falling on the drive shaft 968 to the scraper portion 960 of the drip pan 950. The controller 1002 then controls the gate plate actuator 510 to align the product passage 408a of the gate plate 408 with the piston assembly 401. The controller 1002, in one embodiment, also controls a conveyer 1020 to selectively place a product package under the output 321 of the piston assembly 405. Once, product package has been properly positioned, the drip pan assembly 950 has been moved back and the product passage 408a of the gate plate 408 has been aligned, the controller 1002 activates the metered dose actuator 301 which pushes the piston assembly 405 through the product passage 408a of the gate plate 408 and positions the output 321 of the piston assembly 405 over the product package and dispenses the product in the dispensing cylinder 402 into the product package.

Once the product has been dispensed as verified by the position of the metered actuator 301 via the actuator position sensor 333, the controller 1002 activates the metered dose actuator 301 to retract the piston assembly 401 past the rotary gate valve 606 of the rotary gate valve assembly 600. The controller 1002 then activates the gate plate actuator 510 to place the gate plate 408 in the closed position which is verified by the second gate plate sensor 522b. The drip pan assembly actuator 931 is then activated to move the drip pan 950 to cover the output 321 to prevent any drips of the product from falling onto the product package or conveyer 1020. When the drip pan assembly actuator 931 is activated, the controller 1002 also activates the belt actuator 902 to rotate the second drive shaft 968 of the drip pan 950 so that product drips falling on the drive shaft 968 are directed to the scraper portion 960 of the drip pan 950. The cycle then continues by filling up the product accumulator housing 702 (cylinder) of the product accumulator assembly 700 as discussed above. While that is occurring, a next product package is being positioned by the conveyer 1020. As briefly discussed above, one of the features of the metering product delivery pump system 100 or 900 is the rotary gate valve 606 in combination with the blades 411 of the gate valve cover 412. When packaging product that includes bits of meats, the blades 411 engaging the rotary gate valve 606 cut portions of the meat as the rotary gate valve 606 rotates. This system prevents the rotary gate valve 606 of the metering product delivery pump system 100 or 900 from becoming jammed with meat chunks.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A metering product delivery pump system, the system comprising:
   a product accumulator assembly coupled to receive product;
   at least one controlled product dispensing assembly to output product to a product package;
   a rotary gate valve assembly for each controlled product dispensing assembly, each rotary gate valve assembly coupled to selectively pass product between the product accumulator system and an associated controlled product dispensing assembly, each rotary gate valve assembly including a rotary gate valve and at least one blade configured and arranged to engage the rotary gate valve to cut solid product as the rotary gate valve is rotated; and
   at least one biasing member configured and arranged to bias the at least one blade to engage the rotary gate valve.

2. The system of claim 1, further comprising:
   a gate valve cover having a central passage, the at least one blade coupled proximate the central passage of the gate valve cover.

3. The system of claim 1, wherein the rotary valve includes:
   a blocking portion configured to block product; and
   a cutout product passage portion configured to allow product to pass.

4. The system of claim 1, wherein the product accumulator assembly further comprises:
   a product input pipe coupled to receive product;
   a distribution tube in fluid communication with the product input pipe, the distribution tube in further fluid communication with each rotary gate valve assembly;
   a product accumulator cylinder also in fluid communication with the product input pipe;
   a piston received in the product accumulator cylinder; and
   an accumulator actuator coupled to the piston, the accumulator actuator configured and arranged to selectively move the piston in the product accumulator cylinder to selectively push product through the distribution tube to each rotary gate valve assembly.

5. The system of claim 1, wherein each controlled product dispensing assembly further comprises:
   a dispensing cylinder in fluid communication with the rotary gate valve assembly; and
   a piston assembly received in the dispensing cylinder to selectively push product out an output of the controlled product dispensing assembly; and
   a gate plate configured and arranged to selectively cover the output.

6. The system of claim 5, further comprising:
   a metering control assembly including a metering actuator coupled to selectively move the piston assembly; and
   a gate control assembly including a gate plate actuator coupled to selectively move the gate plate.

7. A metering product delivery pump system, the system comprising:
   a product accumulator assembly coupled to receive product;
   at least one controlled product dispensing assembly to output product to a product package;
   a rotary gate valve assembly for each controlled product dispensing assembly, each rotary gate valve assembly coupled to selectively pass product between the product accumulator system and an associated controlled product dispensing assembly, each rotary gate valve assembly including a rotary gate valve and at least one blade configured and arranged to engage the rotary gate valve to cut solid product as the rotary gate valve is rotated; and
a drip pan assembly configured and arranged to catch unintended discharge of product from the at least one controlled product dispensing assembly.

8. A metering product delivery pump system, the system comprising:
a product accumulator assembly including,
a product accumulator cylinder in fluid communication with a product input,
an accumulator piston received in the product accumulator cylinder, and
an accumulator actuator coupled to move the piston;
a metering valve control assembly in fluid communication with the product accumulator cylinder, the metering valve control assembly including,
a rotary gate valve configured and arranged to rotate to selectively pass product, and
a rotary gate valve actuator coupled to rotate the rotary valve;
a metering control assembly having an output to dispense product to a package, the metering control assembly including,
a dispensing cylinder in fluid communication with the metering valve control assembly to receive product from the metering valve control assembly,
a piston assembly at least received in part in the dispensing cylinder, and
a metered actuator coupled to selectively move the piston assembly;
a gate plate assembly including,
a gate plate configured and arranged to selectively cover the output of the metering control assembly, and
a gate plate actuator coupled to selectively move the gate plate; and
a controller coupled to control the accumulator actuator, the rotary gate valve actuator, the metered actuator and the gate plate actuator in a synchronized fashion to dispense product into a package.

9. The system of claim 8, wherein the metering valve control assembly further comprises:
at least one blade configured and arranged to engage the rotary gate valve to cut solid product as the rotary gate valve is rotated.

10. The system of claim 9, further comprising:
at least one biasing member configured and arranged to bias the at least one blade into the rotary gate valve.

11. The system of claim 8, further comprising:
a drip tray assembly configured and arranged to be selectively positioned under the output of the metering control assembly to catch unintended product discharge; and
a drip tray actuator coupled to move selectively move the drip tray assembly, the controller coupled to control the drip tray actuator.

12. The system of claim 11, wherein the drip tray further comprises:
a drip pan having a first side edge and an opposed second side edge, the drip pan further having a front edge and an opposed back edge;
a first side plate coupled to the first side edge of the drip pan;
at least one first side plate roller coupled to the first side plate;
a second side plate coupled to the second side edge of the drip pan;
at least one second side plate roller coupled to the second side plate;
a scraper portion removably coupled proximate the front edge of the drip pan; and
a connector centrally coupled approximate the back edge of the drip pan, the connector configured to be coupled to the drip tray actuator.

13. The system of claim 12, further comprising:
the first side panel having a first passage proximate a first end of the first side panel and a second passage proximate a second end of the first side panel;
the second side panel having a second passage proximate a first end of the second side panel and a second passage proximate a second end of the second side panel;
a first drive shaft rotatably received in the first passage of the first side panel and the first passage of the second side panel;
a first pulley coupled to a first end of the first drive shaft;
a second drive shaft rotatably received in the second passage of the second side panel and the second passage of the second side panel;
a second pulley coupled to a first end of the second drive shaft; and
a belt rotatably engaged with the first and second pulleys to lock the rotation of the second drive shaft with the first drive shaft.

14. The system of claim 8, further comprising;
at least one accumulator sensor to detect the position of the accumulator piston, the accumulator sensor in communication with the controller;
at least one gate valve sensor to detect the position of the rotary gate valve, the at least one gate valve sensor in communication with the controller; and
at least one metered dose sensor to detect the position of the piston assembly, the at least one metered dose sensor in communication with the controller.

15. A metering product delivery pump system, the system comprising:
a product accumulator assembly coupled to receive and temporarily store product;
at least one controlled product dispensing assembly to output a select amount of product to a product package;
a rotary gate valve assembly for each controlled product dispensing assembly, each rotary gate valve assembly coupled to selectively pass product between the product accumulator system and an associated controlled product dispensing assembly, each rotary gate valve assembly including a rotary gate valve and at least one blade configured and arranged to engage the rotary gate valve to cut solid product as the rotary gate valve is rotated; and
a drip plate assembly configured and arranged to be selectively positioned under the output of the controlled product dispensing assembly to catch unintended product discharge, the drip plate assembly including a drip pan to hold product, the drip pan having a front edge, the drip plate assembly also including a rotating drive shaft positioned proximate the front edge of the drip pan, the drip plate assembly further having a scraper portion positioned between the rotating drive shaft and the drip pan, the drive shaft configured and arranged to rotate in a direction that conveys unintended product drips falling on the rotating drive shaft onto the scraper portion of the drip plate assembly and into the dip tray.

16. The system of claim 15, wherein the product accumulator assembly further comprising:
- a product input pipe coupled to receive product;
- a distribution tube in fluid communication with the product input pipe, the distribution tube in further fluid communication with each rotary gate valve assembly;
- a product accumulator cylinder also in fluid communication with the product input pipe;
- a piston received in the product accumulator cylinder;
- an accumulator actuator coupled to the piston, the accumulator actuator configured and arranged to selectively move the piston in the product accumulator cylinder to selectively push product through the distribution tube to each rotary gate valve assembly; and
- a controller coupled to control operation of the accumulator actuator.

17. The system of claim 15, wherein the at least one controlled product dispensing assembly further comprises:
- a dispensing cylinder in fluid communication with the rotary gate valve assembly;
- a piston assembly received in the dispensing cylinder to selectively push product out an output of the controlled product dispensing assembly;
- a metered actuator coupled to selectively move the piston assembly; and
- a controller coupled to control operation of the metered actuator.

18. The system of claim 15, further comprising:
- a gate plate configured and arranged to selectively prevent the discharge of product from the controlled product dispensing assembly;
- a gate plate actuator coupled to selectively move the gate plate; and
- a controller coupled to control operations of the gate plate actuator.

19. The system of claim 15, further comprising:
- a drip tray actuator coupled to selectively move the drip tray assembly,
- a first gear coupled to rotate the drive shaft;
- a second gear rotational coupled to the drip plate assembly;
- an endless looped belt routed around the first gear and the second gear forming a top portion and a bottom portion of the belt;
- a belt engaging assembly configured and arranged to engage one of the top portion and the bottom portion of the belt depending on the movement of the drip tray assembly to rotate the drive shaft in a desired direction;
- a belt actuator configured and arranged to activate the belt engaging assembly; and
- a controller configured and arranged to control the drip tray actuator and the belt actuator.

* * * * *